(12) United States Patent
Hadley et al.

(10) Patent No.: US 12,333,515 B2
(45) Date of Patent: Jun. 17, 2025

(54) ELECTRONIC PAYMENT PROCESSING

(71) Applicant: mx51 Pty Ltd, Melbourne (AU)

(72) Inventors: Steven Hadley, Sydney (AU); Jason Chisholm, Syndey (AU)

(73) Assignee: mx51 Pty Ltd, Melbourne (AU)

( * ) Notice: Subject to any disclaimer, the term of this patent is extended or adjusted under 35 U.S.C. 154(b) by 55 days.

(21) Appl. No.: 16/349,157

(22) PCT Filed: Nov. 14, 2017

(86) PCT No.: PCT/AU2017/051250
§ 371 (c)(1),
(2) Date: May 10, 2019

(87) PCT Pub. No.: WO2018/090083
PCT Pub. Date: May 24, 2018

(65) Prior Publication Data
US 2020/0193408 A1    Jun. 18, 2020

(30) Foreign Application Priority Data

Nov. 15, 2016  (AU) .............................. 2016904662
Jul. 25, 2017  (AU) .............................. 2017902912

(51) Int. Cl.
G06Q 20/20    (2012.01)
G06F 9/54     (2006.01)
G06Q 20/38    (2012.01)

(52) U.S. Cl.
CPC ............. *G06Q 20/206* (2013.01); *G06F 9/54* (2013.01); *G06Q 20/202* (2013.01); *G06Q 20/3829* (2013.01); *G06Q 20/385* (2013.01)

(58) Field of Classification Search
None
See application file for complete search history.

(56) References Cited

U.S. PATENT DOCUMENTS 7,971,782 B1 *  7/2011  Shams ................. G06Q 20/401
                                                235/382
2005/0228887 A1  10/2005  Wang et al.
(Continued)

FOREIGN PATENT DOCUMENTS

EP    3076373 A1    10/2016
WO    2010/128442 A2    11/2010
WO    2017/004070 A1    1/2017

OTHER PUBLICATIONS

National Institute of Standards and Technology "Guide to Bluetooth Security" by Karen Scarfone and John Padgette. Special Publication 800-121. (Year: 2008).*
(Continued)

*Primary Examiner* — Florian M Zeender
*Assistant Examiner* — Kimberly S. Bursum
(74) *Attorney, Agent, or Firm* — Kilpatrick Townsend & Stockton LLP

(57) ABSTRACT

A payment terminal (2) is described. The payment terminal includes a payment application (6) for processing transaction requests and a web server, for example a websocket application (5) implementing a websocket server (4), for client-server communication over a communication channel with another transaction system device, for example a POS device. Transaction systems including the payment terminal (2) are also described, as are methods for a transaction system.

16 Claims, 13 Drawing Sheets

(56) References Cited

U.S. PATENT DOCUMENTS

| | | | | |
|---|---|---|---|---|
| 2009/0307142 | A1* | 12/2009 | Mardikar | H04W 4/80 705/72 |
| 2010/0012715 | A1 | 1/2010 | Williams et al. | |
| 2010/0058064 | A1* | 3/2010 | Kirovski | H04L 63/0853 713/176 |
| 2014/0122563 | A1* | 5/2014 | Singh | H04L 67/34 709/203 |
| 2014/0279546 | A1* | 9/2014 | Poole | G06Q 20/308 705/44 |
| 2015/0281231 | A1* | 10/2015 | Ganesan | H04L 63/18 455/411 |
| 2016/0094990 | A1* | 3/2016 | Witherspoon | H04W 12/50 713/171 |
| 2016/0212213 | A1* | 7/2016 | Aoki | G06F 13/4027 |
| 2017/0004475 | A1* | 1/2017 | White | G06Q 20/3567 |
| 2017/0202040 | A1 | 7/2017 | Chatterton | |

OTHER PUBLICATIONS

"HYPERCOM Point of Sale" T7 Series Hardware and Installation Manual, version 1.4, published Aug. 6, 1999. (Year: 1999).*

International Search Report dated Dec. 1, 2017, in International Patent Application No. PCT/AU2017/051250, filed Nov. 14, 2017, 4 pages.

Written Opinion dated Dec. 1, 2017, in International Patent Application No. PCT/AU2017/051250, filed Nov. 14, 2017, 9 pages.

Supplementary European Search Report issued in the EP Application No. 17872075, date Mar. 31, 2020, 9 pages.

Mirzadeh Shahab et. al, "Secure Device Pairing: A Survey," IEEE Communications Surveys & Tutorials, Jan. 1, 2014, pp. 17-40, vol. 16, No. 1, IEEE, USA.

Dave Singlee et al, "Improved Pairing Protocol for Bluetooth," Ad-Hoc, Mobile, and Wireless Networks Lecture Notes in Computer Science, Jan. 1, 2006, pp. 252-265, LNCS, Springer Berlin, Germany.

Ming Ki Chong et al, "Usability classification for spontaneous device association," Jul. 2, 2011, pp. 77-89, vol. 16, No. 1, Personal and Ubiquitous Computing, Springer Verlag, Lo.

Communication Art. 94(3) EPC dated Nov. 23, 2021, of corresponding European Application No. 17 872 075.1 (eight pages).

Canadian Office Action dated Aug. 28, 2023 in related Canadian application No. 3,043,633 (four pages).

Australian Examination Report No. 2 dated Aug. 9, 2023 in related Australian application No. 2017361116 (five pages).

Australian Examination Report No. 3 dated Aug. 25, 2023 in related Australian application No. 2017361116 (five pages).

"Bluetooth pairing mechanism", Jul. 9, 2021; (retrieved from Internet Aug. 9, 2023; URL: https://web.archive.org/web/20210925212833/https://community.silabs.com/s/article/bluetooth-pairing-machanism-legacy-pairing-and-secure-simple-pairing-ssp-x?language=en_US.

"Simple Pairing Whitepaper, Bluetooth 2.1", Aug. 3, 2006; (retrieved from the Internet; URL: https://web.archive.org/web/20061018032605/http://www.bluetooth.com/NR/rdonlyres/0A0B3F36-D15F-4470-85A6-F2CCFA26F70F/0/SimplePairing_WP_V10r00.pdf.

"Bluetooth | The wireless standard," published Feb. 20, 2023; Digital Guide IONOS; URL: URL: https://www.ionos.com/digitalguide/server/know-how/bluetooth/.

Yin, Haotian, "Security analysis of Bluetooth Secure Simple Pairing protocols with extended threat model," Journal of Information Security and Applications, vol. 72, pp. 1-13, (Feb. 2023).

Examination report No. 1 for standard patent application dated Aug. 25, 2023 in related Australian patent application No. 2017361116 (five pages).

Communication pursuant to Article 94(3) EPC dated Feb. 19, 2025 in related European Application No. 17 872 075.1; eight pages.

Australian Examination Report No. 2 for Standard Patent Application in related Australian Application No. 2023219985 dated Apr. 4, 2025; four pages.

A. Melnikov, "The WebSocket Protocol", Internet Engineering Task Force, Dec. 2011. Retrieved from the Internet at URL: https://datatracker.ietf.org/doc/html/rfc6455>.

* cited by examiner

ELECTRONIC PAYMENT PROCESSING

RELATED APPLICATIONS

The present application claims the benefit of Australian patent application 2016904662 filed 15 Nov. 2016 and Australian patent application 2017902912 filed 25 Jul. 2017, the entire content of which is incorporated herein by reference.

FIELD

Embodiments of the present disclosure relate to methods, devices, systems and software for electronic payments processing. Certain embodiments relate to payment terminals and point-of-sale systems. Certain embodiments relate to establishing connections between one or more payment terminals and one or more point-of-sale systems.

BACKGROUND

Electronic transactions are often made at the point of sale, for example at a counter or elsewhere within the location of sale. Examples include transactions made in a restaurant, retail store, medical centre, or a trade supplier. Example transactions include a purchase, a purchase with tip and/or cash out, a refund, settlement, pre-authorisation and getting a last transaction.

One example of a transaction system includes a standalone payment terminal. The payment terminal includes a key pad and/or touch screen interface, and a card reader for receiving transaction details. Typically merchants key in a purchase amount and other details using the user interface of the payment terminal. The payment terminal further includes a payment application and communications circuitry for communicating transaction data, for example to a transaction acquirer associated with the payment terminal, which is often but not necessarily a bank. Typically communications are through an Ethernet, or are wireless, for example through a cellular telecommunications network or Wi-Fi connection.

Another example of a transaction system utilises a point of sale (POS) system. In a POS system electronic payments are processed using one or more payment terminals, which are communicatively connected to the POS system, for example using USB, Bluetooth and TCP/IP connection protocols. Alternatively, a payment terminal may be integrated with the POS system. Implementations of POS system can also support other functions, including product and/or service ordering, ordering ahead, invoice generation and management, sales tracking, reconciliation and reporting, stock or inventory management, and automatic product ordering.

The POS system and payment terminal may interact via application programming interfaces (APIs). For example, the payment terminal may make a connection request to the POS to pair with the POS. Once paired, the POS can exercise some level of control over the functions of the payment terminal. Development of a POS and payment terminal solution can require the use of Software Development Kits (SDKs), requiring custom software to be installed into the POS system.

Another example of a transaction system is one that utilises a web-based device. Web-based devices may, for example, run through a web browser on a suitable computational device, for example a tablet computer, or a notebook, laptop or desktop computer. Alternatively, the Web-based device may utilise a native application on the device. The web server may include, or be in communication with, computer processors for providing POS functionality, including a range of payment functions as described above.

Despite the available options and increased functionality associated with at least some of the available options, existing solutions have drawbacks. For example, some existing solutions require a large amount of development effort to support multiple payment terminals, particularly if the available payment terminals are from a range of different providers. In another example, some existing solutions of POS systems do not support integration with web based payment terminals. Further, configuring and/or reconfiguring some existing solutions can be cumbersome, time consuming or otherwise inconvenient.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY

A transaction system is disclosed, the system including a payment terminal with a payment application for processing transaction requests and a web server for client-server communication over a communication channel with at least one further transaction system device.

In some embodiments the payment terminal is configured to additionally communicate as a client with an acquirer server.

In some embodiments a further transaction system device in communication with the payment terminal is a point of sale system configured to make a connection request to the web server, to establish a communication link between the payment terminal and the point of sale system over the communication channel.

In some embodiments a management services module is provided and configured to provide the payment terminal with connection information for the POS system.

In some embodiments the management services module is configured to provide, to the POS system, terminal identifiers of a plurality of payment terminals and receive, from the POS system, information indicating a selection of a terminal identifier and provide the payment terminal associated with the terminal identifier with the connection information.

In some embodiments the management services module, in response to receipt of the terminal identifier, generates and causes display of a code on a display associated with the management services module and provides the payment terminal associated with the terminal identifier with the connection information only after receipt from the payment terminal of data identifying the code.

In some embodiments the transaction system further includes a monitoring module, wherein the monitoring module and wherein the payment terminal is configured to report status information to the monitoring module.

In some embodiments the web server utilises a WebSockets protocol for the client-server communication.

A payment terminal is disclosed, the payment terminal including a payment application for processing transaction requests and a web server for client-server communication over a communication channel with a transaction processing device, for example a POS device. The web server and payment application communicate via one or more application programming interfaces (APIs).

In some embodiments the payment terminal returns via the web server, in response to a call, a list of functions supported by the one or more APIs.

In some embodiments the payment terminal is configured to receive, via the web server, an update to the one or more APIs. In some embodiments the update comprises adding a new API.

In some embodiments the payment terminal, in particular the payment application, is configured to additionally communicate as a client with a transaction acquirer server.

In some embodiments the payment application is on a secure element of the payment terminal, whereby a process on the web server cannot access data of the payment application except for through the API.

In some embodiments the web server runs on another secure element of the payment terminal, different from the secure element for the payment application.

A method of establishing a transaction system is disclosed the method including registering, at a management module, one or more payment terminals. The management module provides to a POS system a listing of payment terminals and receives from the POS system a selection of a payment terminal from the listing of payment terminals. The management module provides to the selected payment terminal, connection information for the POS system.

In some embodiments registering includes associating at least one parameter with a payment terminal and the listing of payment terminals is provided in response to a request from the POS system. The request from the POS system specifies at least one said parameter, whereby the listing is generated based on a matching of the at least one parameter in the request with parameters of registered payment terminals.

A method of establishing a transaction system is disclosed, the method including providing one or more merchant terminals that include a payment application and a web server. One or more POS systems for the one or more merchant terminals is also provided, the POS system(s) communicating with the merchant terminal(s) via the web server. A management services module is provided, the management services module communicating with both the payment terminal, through the web server, and with the POS system, the management services module managing connections between the one or more merchant terminals and the one or more POS systems.

In some embodiments the payment application is configured to communicate as a client with a transaction acquirer server.

In some embodiments the management services module is remote from the one or more POS systems and the one or more merchant terminals.

In some embodiments the one or more POS systems and the one or more merchant terminals are local with respect to each other.

A payment terminal is disclosed, the payment terminal comprising a communications interface for receiving transaction requests from a point of sale device over a network and a payment application for processing said transaction requests. The payment terminal includes a processor configured to cause the payment terminal to: implement a pairing process with the point of sale device over the network, the pairing process establishing a trusted relationship between the payment terminal and the point of sale device whereby the received transaction requests are encrypted in accordance with an encryption protocol; display during the pairing process, on a display, a code that is dependent on an element of the encryption protocol so that the code is able to be independently generated by the point of sale device with which the payment terminal is pairing, but not able to be independently generated by other devices; and receive user input, via a user interface, the user input indicating the code is acceptable; wherein completion of the pairing process to establish the trusted relationship is dependent on receiving the user input indicating the code is acceptable.

A method for a payment terminal is disclosed, the method comprising, at a payment terminal: displaying, on a display screen, a network address of the payment terminal; receiving, at said network address, a pairing request from a point of sale device; exchanging encryption keys with the point of sale device; displaying, on the display screen, an encryption key dependent code; receiving, via a user interface, user input responsive to the displayed encryption key dependent code; and selectively pairing or not pairing with the point of sale device dependent on said user input.

As used herein, except where the context requires otherwise, the term "comprise" and variations of the term, such as "comprising", "comprises" and "comprised", are not intended to exclude further additives, components, integers or steps.

Further aspects of the present disclosure and further embodiments of the aspects described in the preceding paragraphs will become apparent from the following description, given by way of example and with reference to the accompanying drawings.

DETAILED DESCRIPTION

Figure 1:
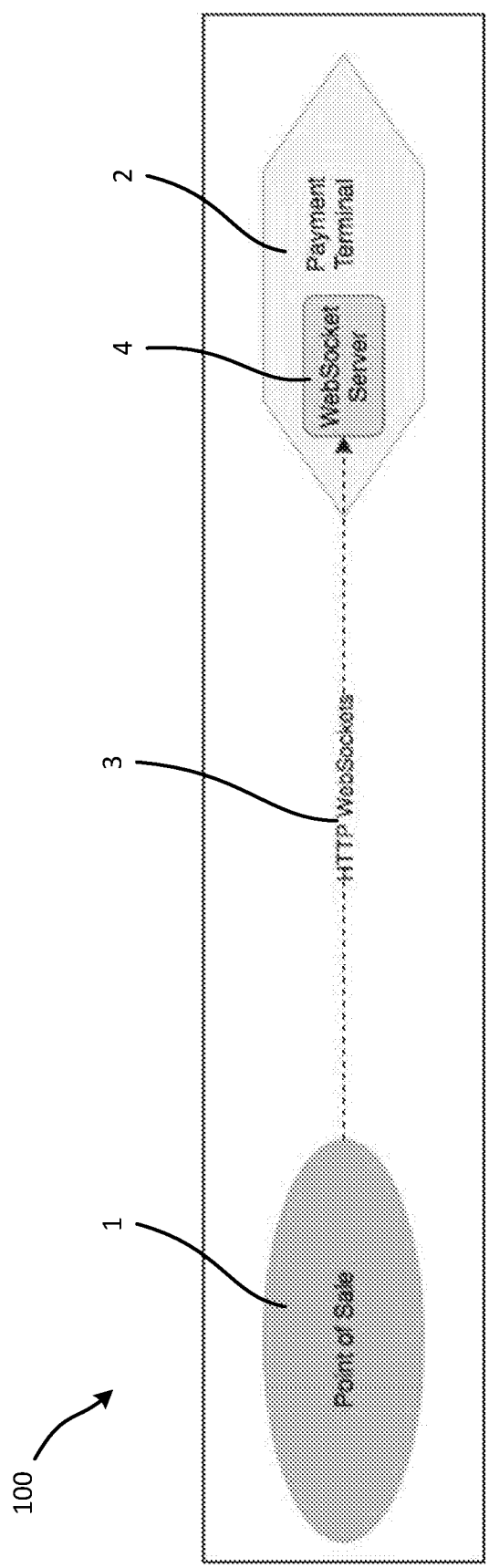
FIG. 1 shows a transaction system comprising a POS system and a payment terminal.

FIG. 1 diagrammatically shows a transaction system 100 according to one embodiment, including a POS system 1, a payment terminal 2 (a merchant terminal) and a communication link 3 between the POS system 1 and the payment terminal 2.

The payment terminal 2, includes hardware and functionality to receive transaction particulars. For example, the payment terminal 2 may include one or more of a magnetic swipe card reader, a chip reader, NFC circuitry, Bluetooth circuitry or similar to receive transaction particulars, for example from or related to a payment card. The payment terminal 2 may also include a bar code reader, keypad, touch screen interface or similar for receiving details of the product. The product details may also or alternatively be received from the POS system 1 via the bidirectional communication link 3.

The payment terminal 2 uses conventional methods to process transaction requests according to the transaction particulars. For example, the payment terminal 2 connects to an acquirer and requests authorisation for a transaction, for routing via a transaction network to a card issuer, receives a response to the authorisation request, processes authorised transactions and sends settlement requests reflecting completed transactions.

The bidirectional communication link 3 is for example, a single TCP connection in a local area network, such as Ethernet or Wi-Fi (one or both options may be available on the POS system 1 and payment terminal 2). In one embodiment the bidirectional communication link 3 is a full duplex link. In one embodiment the bidirectional communication link 3 is a web services link, for example using HTTP. In one embodiment the bidirectional communication link 3 is implemented using the WebSocket Protocol, as published in RFC 6455 by the Internet Engineering Task Force (IETF). In one embodiment RESTful is utilised. In another embodiment a combination is used, for example a combination of the Websocket Protocol and RESTful. For simplicity of explanation, normally throughout the following description reference will be made to embodiments utilising the Websocket Protocol.

In one embodiment, the payment terminal 2 is designated as the server and the POS device 11 the client. The payment terminal 2 accordingly includes a WebSocket Server 4. The bidirectional connection link 3 runs over sockets, but is hidden from the client. This approach also means that proxies and firewalls do not block the connection as it is established on HTTP (e.g. port 80) unlike Sockets, used in some pre-existing POS systems, which may be blocked.

The POS system 1 is configured to operate according to an API, for example an API in JavaScript Object Notation (JSON) format, which runs over WebSockets, using suitable libraries that support the protocol. The POS system 1 can be web based or native.

Figure 2:
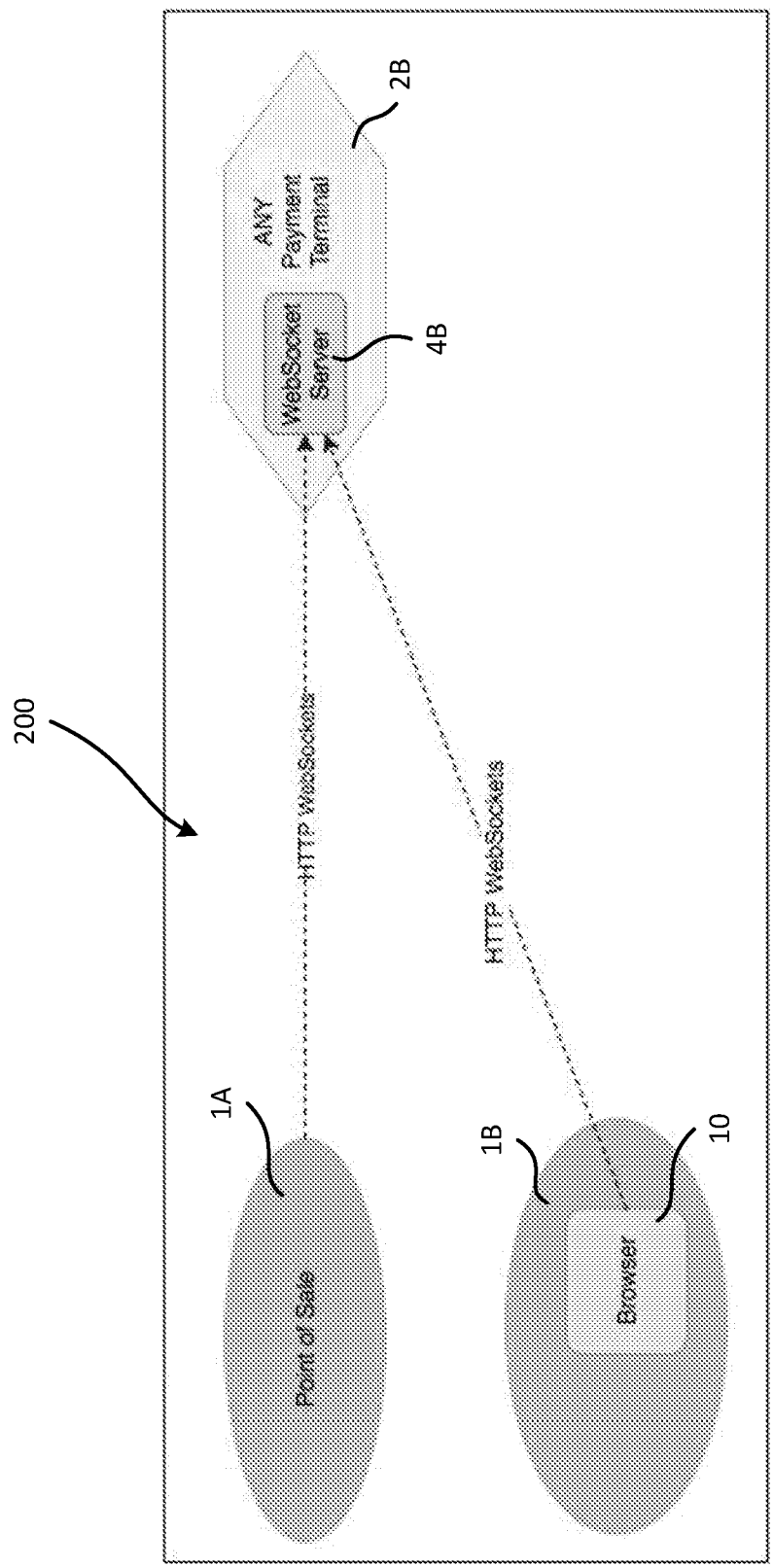
FIG. 2 shows a transaction system comprising a payment terminal and two POS systems.

FIG. 2 shows a transaction system 200 including two POS systems, a first POS system 1A that is a native system on its computational device and a second POS system 1B, which is a web based system and has installed thereon a web browser 10, for access to web-based services including interactions with a payment terminal 2B. Both POS systems 1A, 1B communicate with the payment terminal 2B via respective bidirectional communication links, for example as described above. The payment terminal 2B includes a server for the communications over the bidirectional communication links, for example WebSocket server 4B. While not shown in FIG. 2, in some embodiments one or more POS systems can connect to many payment terminal is simultaneously.

Figure 3:
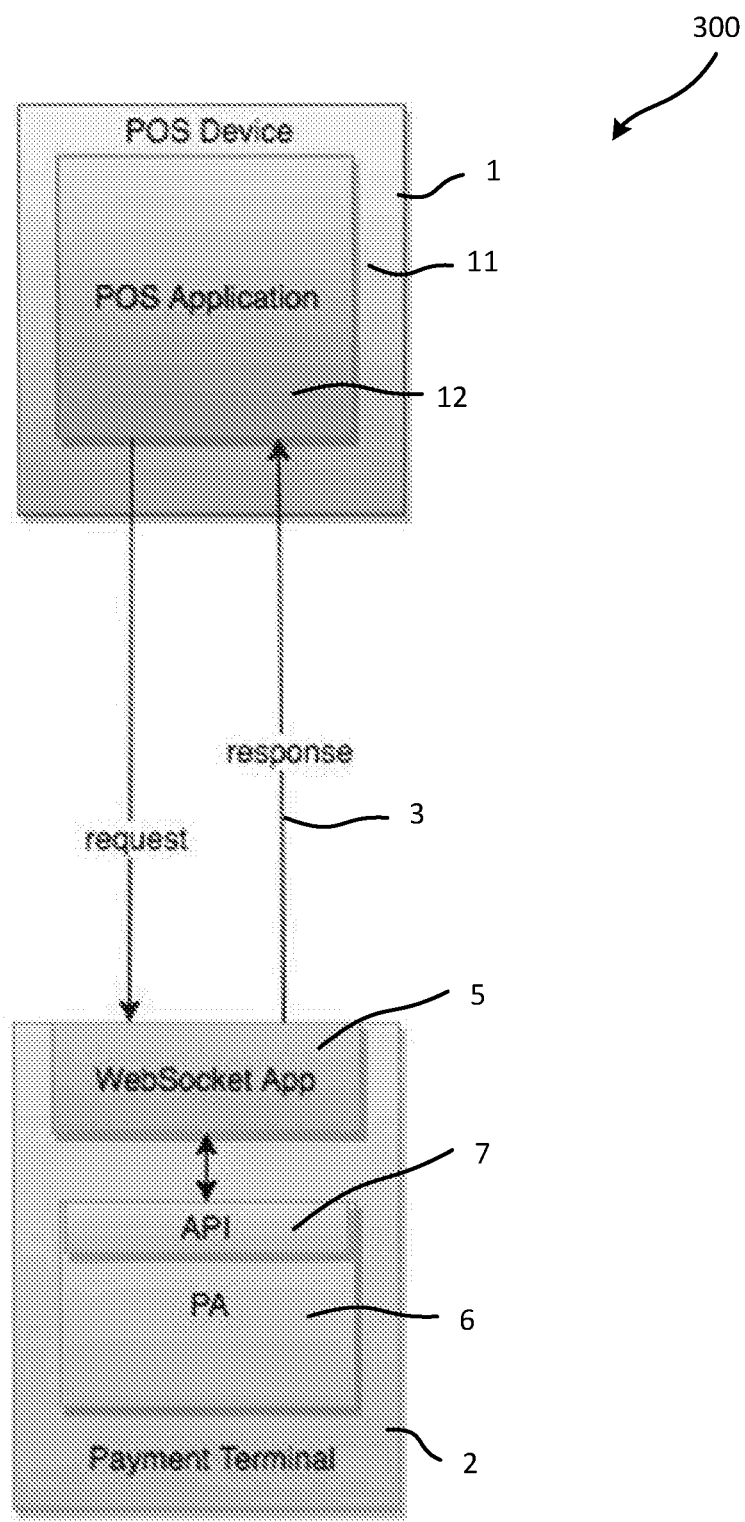
FIG. 3 shows a transaction system comprising a POS system and a payment terminal.

FIG. 3 shows an embodiment of a transaction system 300. In one embodiment the transaction system 300 operates in the same or similar manner as the transaction system 100 described above Like reference numerals are therefore adopted for like components between FIGS. 1 and 3. The transaction system 300 includes a POS system 1, a payment terminal 2 and a bidirectional communication link 3.

The POS system 1 includes a POS device 11 and a POS application 12 running on the POS device 11. For example, the POS application 12 may be stored on non-transient memory of the POS device 11 and comprise instructions readable and executable by one or more processors of the POS device 11. The POS application 12 provides and implements the communications functions described herein between the POS device 11 and the (one or more) payment terminal 2. The POS application 12 is in one embodiment a stand-alone application. In other embodiments the POS application 12 is a module or series of functions in a multi-function application.

A WebSocket application 5 installed on the payment terminal implements the Websocket Server 4. For example, the WebSocket application 5 may be stored on non-transient memory of the payment terminal 2 and comprise instructions readable and executable by one or more processors of the payment terminal 2. The WebSocket application 5 provides and implements the communications functions described herein between the payment terminal 2 and the (one or more) POS device 11.

The payment terminal 2 hosts a payment application 6. The payment application 6 attends to the processing of transaction requests, for example receiving credit card and/or debit card details through an appropriate reader, keypad, touch screen, camera or other suitable device of the payment terminal 2. The payment application 6 is in one embodiment a stand-alone application. In other embodiments the payment application 6 is a module or series of functions in a multi-function application.

In one embodiment the payment terminal 2 exposes an API 7 for the payment application 6, allowing the payment application 6 to be controlled. Examples of control functions include: initiate a transaction; get a transaction response; reverse a transaction; confirm a transaction; cancel a transaction; get a final response; print a receipt; get merchant configuration information. These control functions, or lower level calls, are mapped to the higher level API 7. In some embodiments one or more control functions are aggregated into a single higher level call for the API 7. Accordingly, the use of the API 7 allows the control functions to be abstracted, so that there may be only one API exposed to all POS systems 1 in communication with the payment terminal 2 over respective direct bidirectional communication links 3. The API may, for example utilise the WebSockets protocol, consistent with the protocol for the bidirectional communication link 3. This facilitates embodiments of payment terminal 2 with a standard interface to a POS system 1 across all terminals, regardless of the internal API.

As illustrated in FIG. 3, in one embodiment the POS system 1 acts as a client, initiating a pair request with the (or each) payment terminal 2. Once the POS system 1 and payment terminal 2 are paired, then bidirectional communication over the bidirectional link 3 may commence, for example with the POS system 1 sending a request to the payment terminal 2 and the payment terminal 2 receiving the request, processing it and returning a response to the POS system 1.

In one embodiment messages between the POS system 1 and payment terminal 2 are encrypted, for example using the transport layer security (TLS) protocol to provide a secure WebSocket connection (WSS).

According to some embodiments, there is provided a transaction system entity, named herein a management services module, operable within a transaction system. In some embodiments a payment terminal and a POS system communicates with the management services module to facilitate pairing between the payment terminal and a POS system. For example, a payment terminal and a POS system can register with the management services module. In one embodiment a, the, or each POS system in the transaction system manages payment terminal pairings to itself. For example, the POS system receives from the management services module identification of payment terminals available for pairing and selects one or more of the payment terminals from those identified. The terminal is then provided with an identifier of the POS system, suitable to request from the management services module connection information for the POS system. The terminal obtains the connection information and based on the connection information pairs with the POS system.

Figure 4:
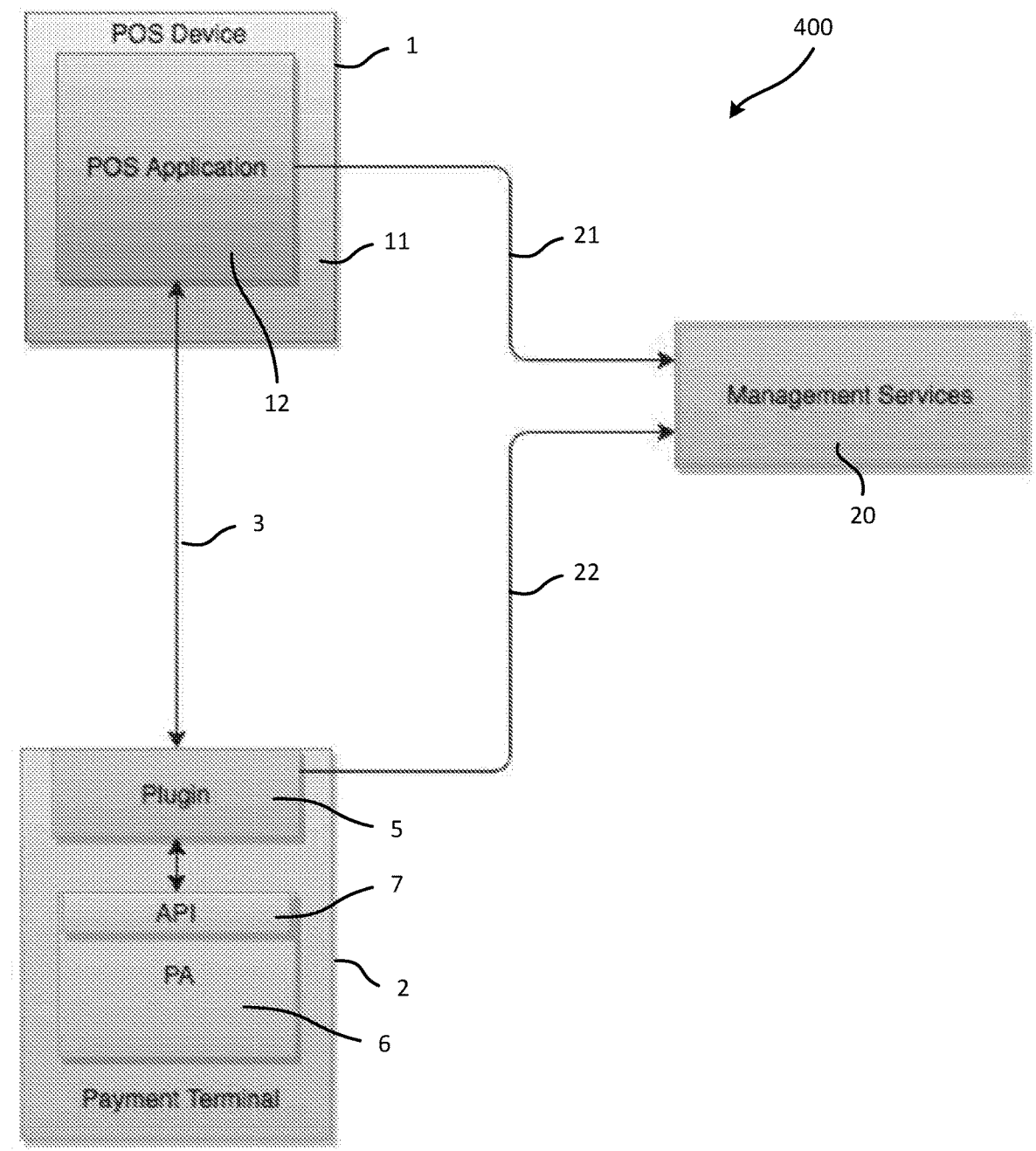
FIG. 4 shows a transaction system comprising a POS system, a payment terminal and a management services module.

FIG. 4 shows an embodiment of a transaction system 400. In one embodiment the transaction system 300 operates in the same or similar manner as the transaction systems 100, 300 described above. Like reference numerals are therefore adopted for like components between FIGS. 1, 3 and 4. In addition to a POS system 1 including a POS device 11 and POS application 12, a payment terminal 2 including a WebSocket application 5, payment application 6 and API 7 and a bidirectional communication link 3, the transaction system 400 also includes a management services module 20.

The management services module 20 includes, for example, one or more processors and non-transient memory with instructions readable by the one or more processors for implementing the functions of the management services module 20 described herein. The management services module 20 is also configured to communicate with both the (one or more) POS system 1 and the (one or more) terminal 2 via communication links 21 and 22 respectively. Communication links 21, 22 may utilise the same or different hardware and the same or different protocols. In some embodiments at least one of the communications links 21, 22 is wireless. By way of example, communications links 21, 22 may be selected from mobile communications (e.g. radio or cellular) or WiFi.

In one embodiment the management services module 20 is remote from POS system 1 and/or terminal 2. In this embodiment, management services module 20 may provide a centralised service for one, or a plurality of separate transaction systems, for example transaction systems operated by distinct entities, which entities might be at geographically separate locations. In this manner, management services module 20 may be a centralised service module. In one embodiment management services module 20 is provided as a service on the internet, with a publicly accessible domain and services called via an API of the management services module. In another embodiment, management services module 20 alternatively or additionally provides local area services only, whereby for example each merchant may install and manage their own management services module 20. In another embodiment, management services module is incorporated into the payment terminal 2 and communicates with the WebSocket application 5 using an API, in a similar manner as the payments application 6 and API 7. In another embodiment, management services module is incorporated into the POS system 1. In another embodiment, management services module is distributed between two or more devices, operating on a peer-to-peer basis.

The management services module 20, in one embodiment, facilitates configuration and/or reconfiguration of the transaction system 400, or another suitable transaction system in which it is located. For example, the transaction system 400 may include a plurality of POS systems, one for one location (e.g. a first floor of a building) and one for another location (e.g. a second floor of the building). The management services module 20 provides, to a payment terminal 2, connection details of either the first or second floor POS system. The payment terminal 2 then uses those details to connect to the appropriate POS system. New or replacement payment terminals 2 may be provided for the transaction system 400 in a similar manner. In one embodiment, the POS systems are associated with different entities, for example two different merchants. In one embodiment, the management services module maintains a register of identification details of the payment terminals associated with each merchant, location or other delineator, which in one embodiment is a list of POS system(s) 1. In one embodiment a payment terminal 2 is provided, by the management services module 20, with the connection details of more than one POS system by which it is configured to be able to connect to any of those POS systems.

In one embodiment the management services module 20 facilitates new payment modes. For example, managements services module 20 (or a management services module 20 amongst a plurality of such modules), implements an eWallet service. The API 7 is exposed via the WebSocket app 5 for developers to develop services like eWalllet services. In one embodiment the management services module 20 implements the service, or routes the service through it. In one embodiment multiple services are provided, for example multiple eWallets, a service to display a barcode on the payment terminal, for example for one or more loyalty programs and/or others. In one embodiment the management services module 20 is configurable to provide a selectable subset of the available services on a payment terminal 2.

From time to time, as new services are developed, new APIs 7 may be added to the payment terminal 2. These may be added as part of a software update process for the payment terminal 2, for example from the management service module 20 or real-time monitoring module 30 (see later herein). By providing a function to update APIs and to expose it, via the WebSockets app 5 for use, a payment terminal 2 may provide flexibility to reflect changes in the payments industry. This in turn may provide a better return on investment in the hardware of the payment terminal 2.

Figure 5:
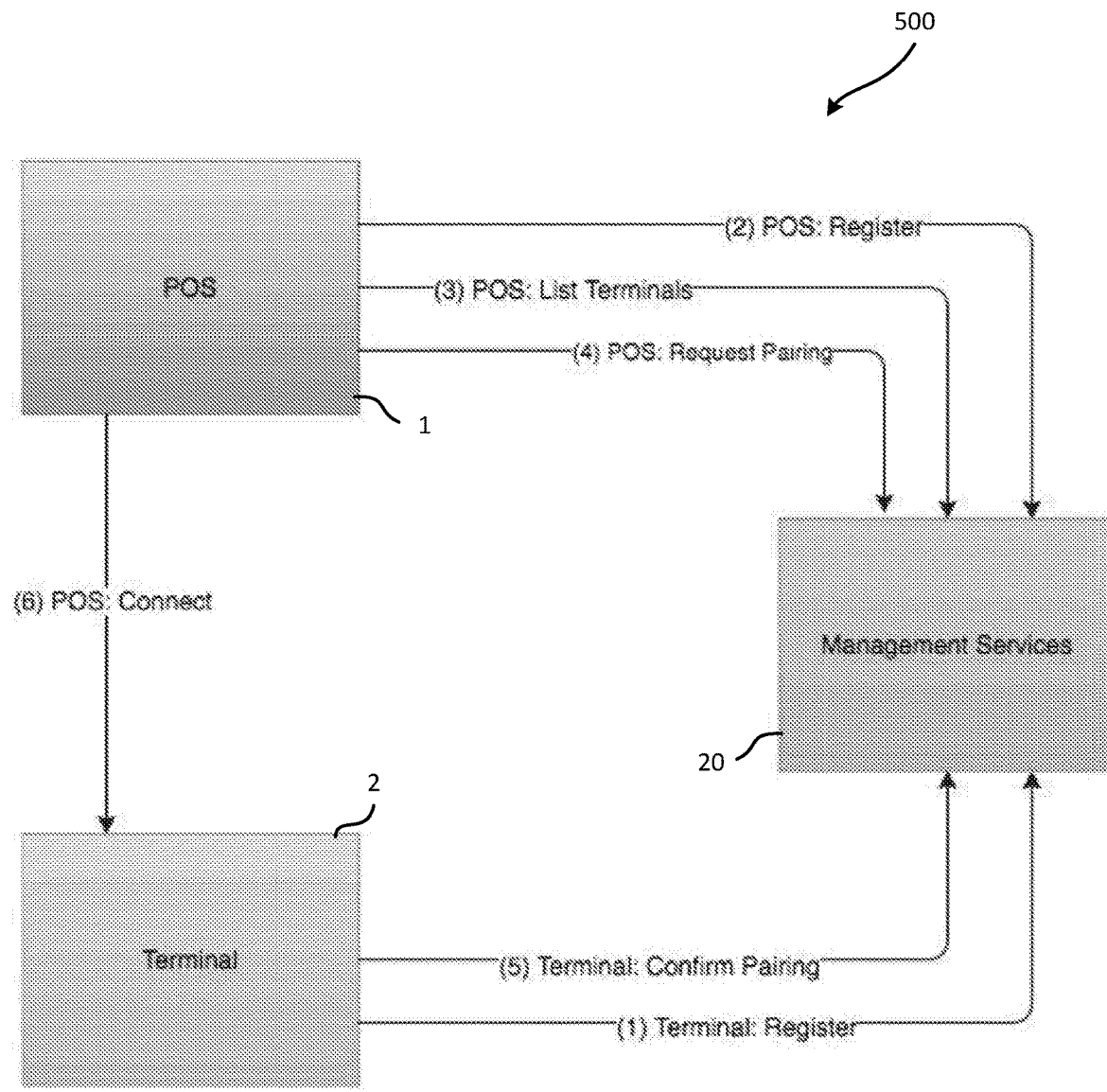
FIG. 5 shows an embodiment of communications between a POS system, a payment terminal and a management services module.

FIG. 5 shows an embodiment of a transaction system 500. The transaction 500 may, for example, be the transaction system 400 described above. FIG. 5 illustrates an embodiment of communications between a POS system 1, payment terminal 2 and management services module 20. In one embodiment all communication steps are via web services, for example utilising an HTTP API, for example RESTful, WebSockets, or a mixture of both.

On or following startup or initialisation the payment terminal 2 registers itself to the management services module 20, for example using built in 3G communications circuitry in the terminal. At this time the terminal does not yet have sufficient information to connect to a network, or may not have, or may require confirmation. Similarly, the POS system 1 also registers itself to the management services module. After registration, the POS system 1 requests a list of payment terminals available for it to pair with. In one embodiment the requested list is constrained, based on one or more parameters (e.g. location, floor, device capabilities etc). The POS system 1 selects or receives a selection of a terminal and sends, to the management services module 20, a request to pair with the selected terminal. The management services module 20 provides, for example by a return communication to the POS system 1, a code, which may be a unique code. A person at the relevant payment terminal 2 opens a pairing menu on the payment terminal 2 and enters the unique code. The payment terminal 2 communicates the unique code to the management services module 20. If the communicated code matches the code returned to the POS system 1, the management services module 20 allows the payment terminal 2 to download the details of the POS system 1 and associated network connection information. The management services module 20 also provides to the POS system 1, if it has not previously in the process already done so, details of the payment terminal 2 and associated network connection information. A display screen on the payment terminal 2 may display an indicator of successful establishment of communication connection with a POS system, for example by displaying "paired".

In one embodiment, the details of the POS system 1 and associated network connection information provided by the management services module 20 consists of or includes: an IP address of the payment terminal 2, for the POS to connect to; an IP address and communication protocols for payment terminal to use; SSID and password for WiFi if the payment terminal is instructed to use WiFi; a shared secret used to generate an authentication token; and a TLS certificate for the payment terminal 2 to use.

The above and additional or alternative device and connection details can be set and updated using APIs exposed by the management services module 20.

In one embodiment the management services module 20 can handle multiple merchants and multiple terminals. The terminals can be grouped in such a way that a POS can easily find the appropriate terminal to pair with. In one embodiment the group to which the terminal belongs is identified by metadata associated with the terminal, which the management services module 20 can access and modify. The management services module 20 additional can specify the available groups and reconfigure them from time to time, based on user input.

In one embodiment other APIs exposed by the management services module include, but not limited to, one or more of: remove pairing, cancel pairing, remove a terminal, add a terminal, remove a location/group.

Figure 6:
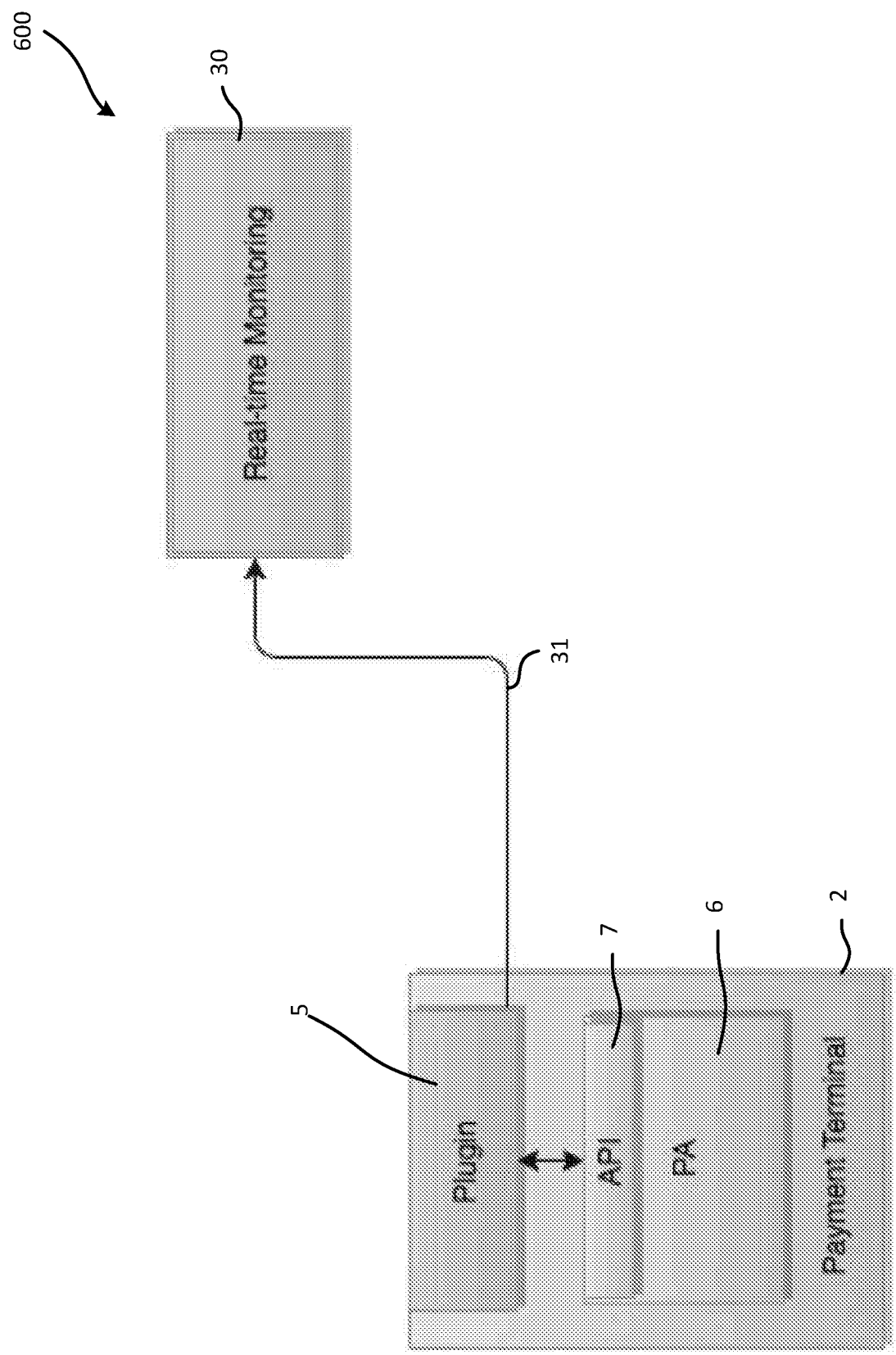
FIG. 6 shows a transaction system comprising a payment terminal and a real-time monitoring module.

FIG. 6 shows an embodiment of a transaction system 600. In one embodiment, the transaction system 600 includes a payment terminal 2, according to any embodiment herein described. The payment terminal 2 includes a WebSocket application 5, payment application 6 and API 7.

The transaction system 600 further includes a real time monitoring module 30. The real time monitoring module 30 includes, for example, one or more processors and non-transient memory with instructions readable by the one or more processors for implementing the functions of the real time monitoring module 30 described herein. The transaction system 600 may further include one or more POS systems in communication with the payment terminal 2 (or more than one payment terminal 2), for example POS system 1, as described herein.

The payment terminal 2 communicates with the real time monitoring module 30 via the WebSocket application 5 and a communication link 31, which may be bidirectional communication link. The bidirectional communication link 3 may be for example, a single TCP connection in a local area network, such as Ethernet or Wi-Fi (one or both options may be available on the POS system 1 and payment terminal 2). In one embodiment the bidirectional communication link 3 is a full duplex link. In one embodiment the bidirectional communication link 3 is a web services link, for example using HTTP. In one embodiment the bidirectional communication link 3 is implemented using the WebSocket Protocol, for example as published in RFC 6455 by the Internet Engineering Task Force (IETF). In one embodiment RESTful is utilised. In another embodiment a combination is used, for example a combination of the Websocket Protocol and RESTful.

In one embodiment a transaction system includes both a management services module 20 and a real time monitoring module 30. In one embodiment the management services module 20 and a real time monitoring module 30 each have a respective plugin application for the payment terminal. In another embodiment a single plugin is provided for both modules. In one embodiment the respective communication links 3 and 31 utilise the same protocol.

In one embodiment the real time monitoring module 30 is remote from POS system 1 and/or terminal 2. In this embodiment, real time monitoring module 30 may provide a centralised service for one, or a plurality of separate transaction systems, for example transaction systems operated by distinct entities, which entities might be at geographically separate locations. In this manner, real time monitoring module 30 may be a centralised service module. In another embodiment, real time monitoring module 30 alternatively or additionally provides local area services only, whereby for example each merchant may install and manage their own real time monitoring module 30. In another embodiment, real time monitoring module 30 is incorporated into the payment terminal 2 and communicates with the WebSocket application 5 using an API, in a similar manner as the payments application 6 and API 7. In another embodiment, real time monitoring module 30 is incorporated into the POS system 1. In another embodiment, real time monitoring module 30 is distributed between two or more devices, operating on a peer-to-peer basis.

A payment terminal may experience many events that need to be handled real-time. These include security attacks, hardware problems, connectivity issues, payment issues, general statistics e.g. battery level, amongst others. The events have data notifications associated with them, and the payment terminal, for example the payment terminal 2 are configured to send the data notifications to the real time monitoring module 30. The real time monitoring module 30 includes an interface accessible by one or more of the POS system vendor, payment terminal vendor, transaction acquirer (e.g. a bank), payment card system (e.g. VISA, Mastercard, Diners, American Express), and transaction card issuer (e.g. a bank). The real-time monitoring service exposes data to parties based on levels of access control. This will be both in raw data and aggregated data depending on the use case.

This system also allows the ability to proactively monitor devices and apply updates or configuration to the terminal. To be able to spot an issue before it affects the end customer (merchant) is critical to maintain happy and loyal customers.

The real-time monitoring system can provide bidirectional messages if the connection mode is WebSockets. This means that network events such as "VISA cards issued by XYZ are experiencing problems" can easily be pushed to the terminal which means that this can then be pushed to any connected POS systems. This system could easily be extended to provide configuration updates (new card tables, new TLS certs etc) rather than with the current system (TMS) that requires the terminal to dial in once a day. Instead these updates could be done in real-time/near-real-time and their progress monitored by the same system.

The real-time monitoring aspect of the system does not take priority over the ability to take payments. For example, if the payment terminal 2 accesses the real time monitoring module 30 through the same network as it accesses a POS system 1, then if the network is slow or degraded, any messages are batched by the payment terminal 2 for sending later. In one embodiment the sending occurs when the network conditions improve above threshold. In one embodiment the sending occurs after a predetermined delay or after a predetermined number of send attempts, irrespective of whether the network conditions have improved.

Figure 7:
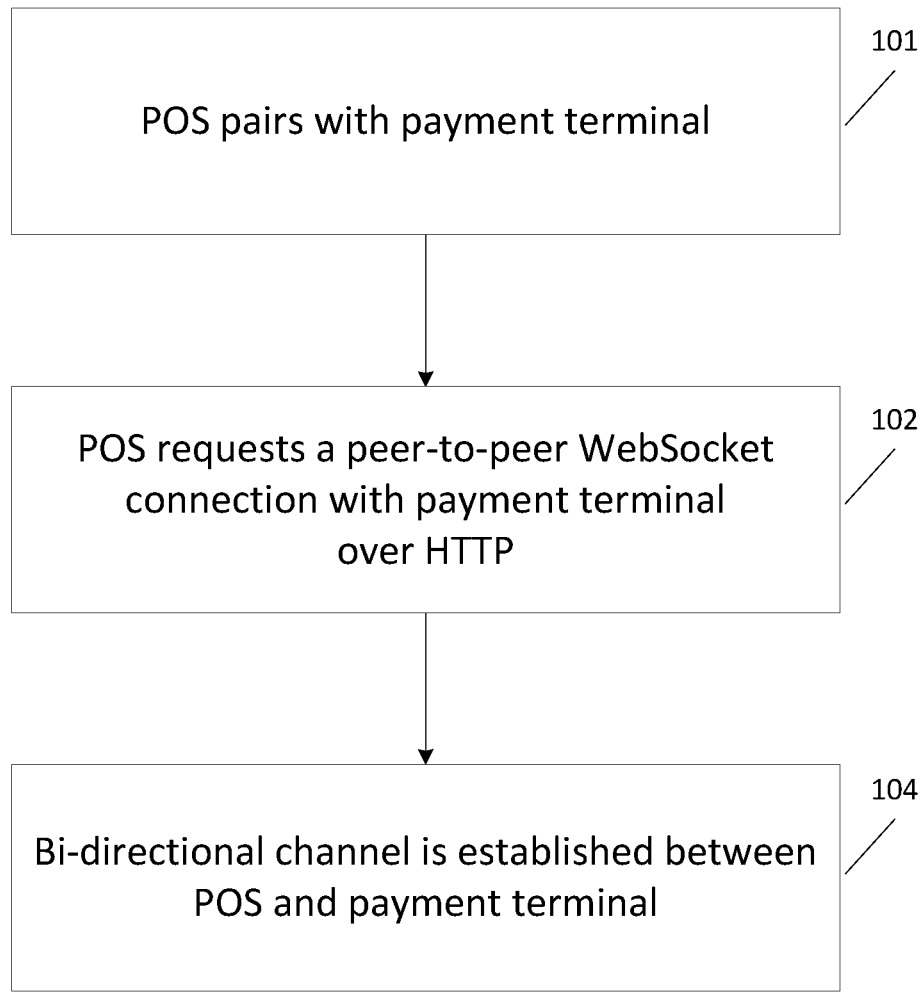
FIG. 7 shows a flow diagram of a pairing process between a payment terminal and a POS system.

FIG. 7 shows an embodiment of a process flow for a payment terminal, for example the payment terminal 2, to establish a connection with a POS system, for example the POS system 1. In one embodiment the combination of the POS system and the payment terminal has a client-server architecture, where the POS system (client) requests and pairs with the payment terminal (server) (step 101) and then requests and establishes a connection with the payment terminal, in one embodiment a peer-to-peer WebSocket connection with the POS system over HTTP (step 102). A bidirectional channel is established between the POS system (client) and the payment terminal (server) (step 104).

Figure 8:
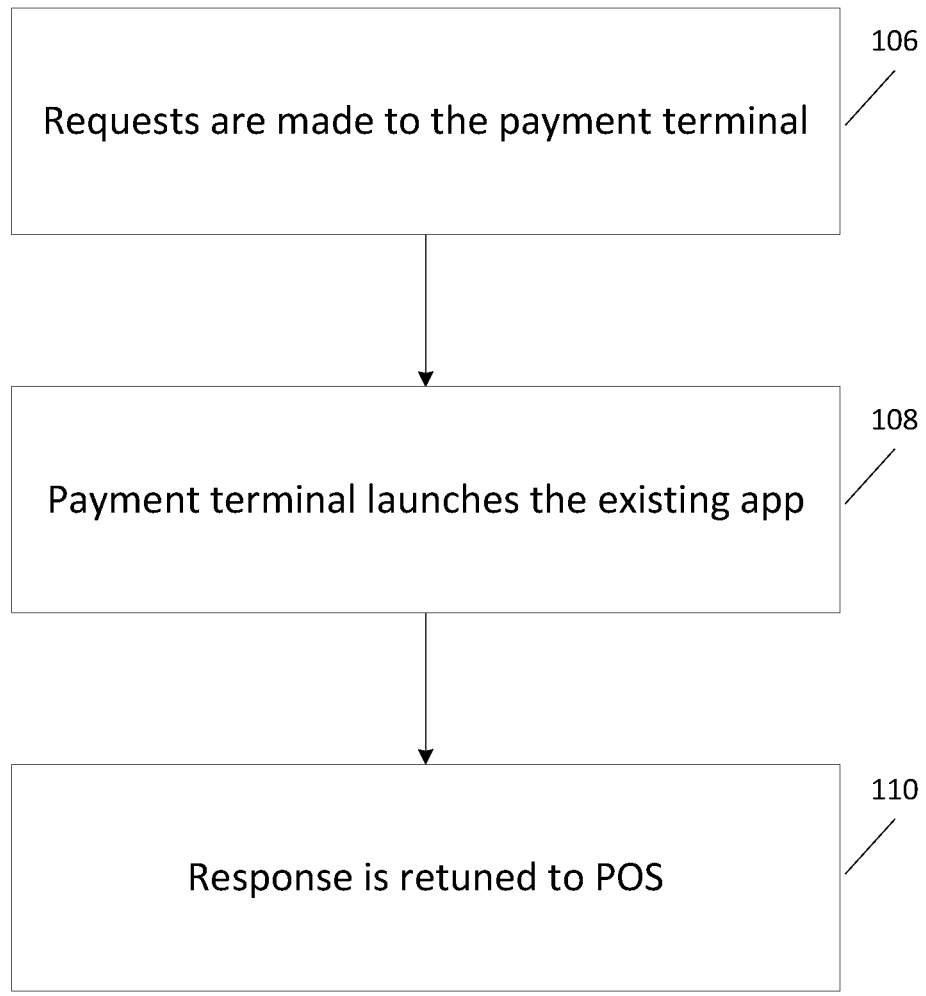
FIG. 8 shows a flow diagram of a transaction request process between a payment terminal and a POS system.

FIG. 8 shows a process flow for requests to the payment terminal. Requests to the payment terminal occur following establishment of the connection between the payment terminal and a POS system, as described with reference to FIG. 7. Two example requests are a request to make a purchase and a request to provide a refund. When a request is received by the payment terminal, the payment terminal launches, invokes or calls the payment application (step 108), for example the payment application 6, within the payment terminal. Once the request has been processed, for example the transaction is completed, a response is returned to the POS system (step 110), via interface software, for example the WebSocket application 5 described herein above. The response is based on the original request, such that for example, if the original request was for payment, the response may be either a confirmation that the payment has been approved or that the payment was declined. If the original request was for a refund, the response may be either a confirmation that the refund was successful or that it was unsuccessful.

In one embodiment, the payment terminal provides to the POS system informational messages during the processing of a request. For example, for a purchase request, the payment terminal may send notifications indicating one or more of: a user has presented a transaction card; the user has selected an account; and the user has entered a PIN.

In one embodiment, the base API and any subsequent additions are managed by API versioning, provided for example as part of the WebSockets pairing negotiation and as an output to the payment terminal configuration API. For example, on connection establishment a payment terminal will identify the WebSocket subprotocols it supports, which in turn identify the version(s) of the API that are supported. Additionally or alternatively a call to the payment terminal via the API returns version information and/or information identifying the services and functions it supports.

Figure 9:
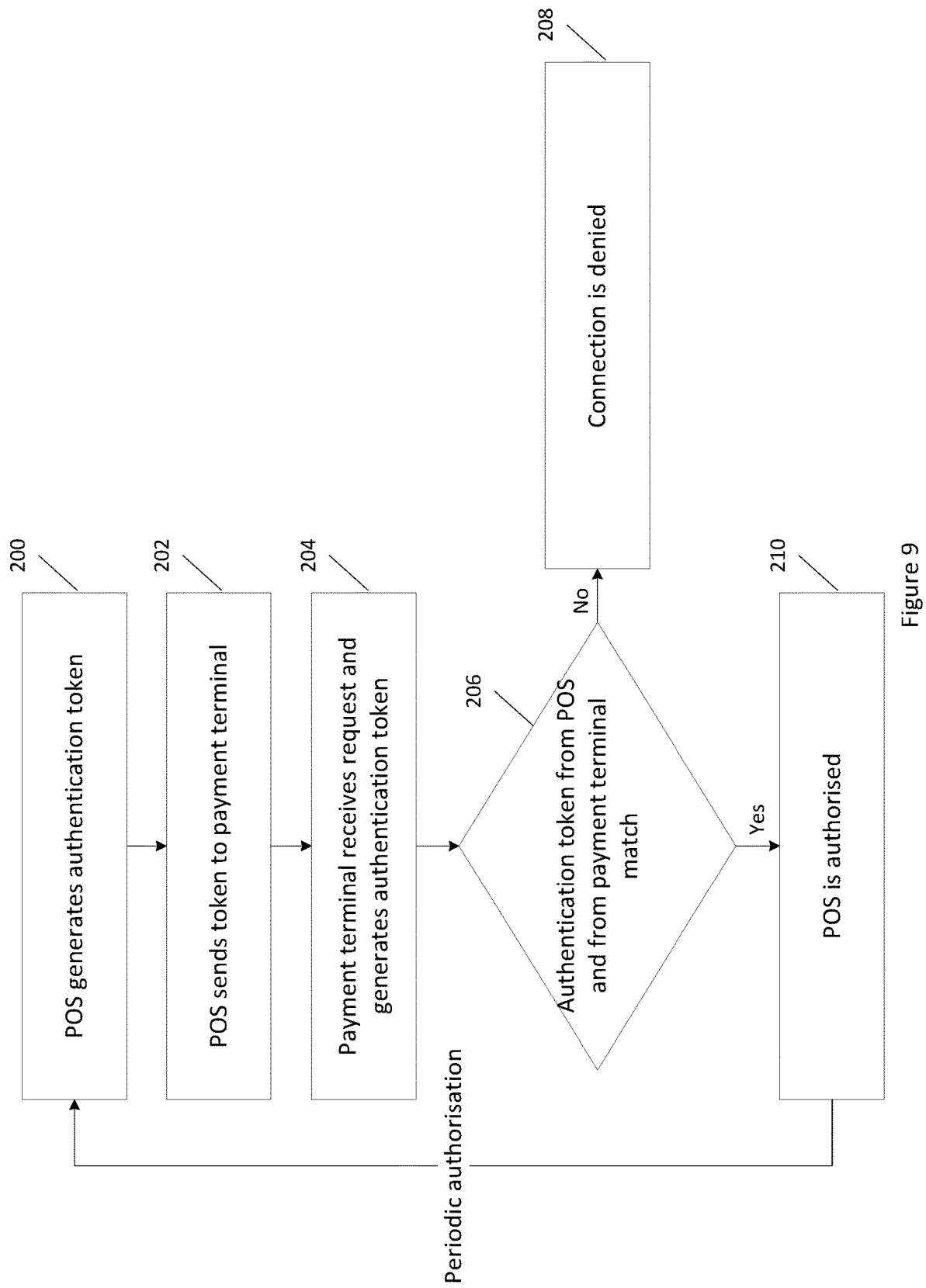
FIG. 9 shows a flow diagram of an authentication process between a POS system and a payment terminal.

FIG. 9 shows another embodiment of a process flow for the establishment of a connection between a payment terminal, for example the payment terminal 2, and a POS system, for example the POS system 1. For example, step 104 from FIG. 7 may include the process flow of FIG. 9. Responsive to the payment terminal initiating a peer-to-peer WebSocket connection with the POS system, the POS system generates an authentication token (step 200). In one embodiment the authentication token is generated using a shared secret and a time stamp. The POS system sends an authentication request to the payment terminal (step 202), which pairing request includes the authentication token. Responsive to receipt of the authentication request from the POS system, the payment terminal also generates an authentication token, using the same shared secret and the timestamp, which may be incremented (step 204) and sends this to the POS system. If the authentication token from the payment terminal and the POS do not match, then the authentication is unsuccessful and the connection is denied (or terminated). If the authentication token from the payment terminal and the POS match, then the POS is authorised and the connection is maintained. In one embodiment authentication is repeated periodically.

Figure 10:
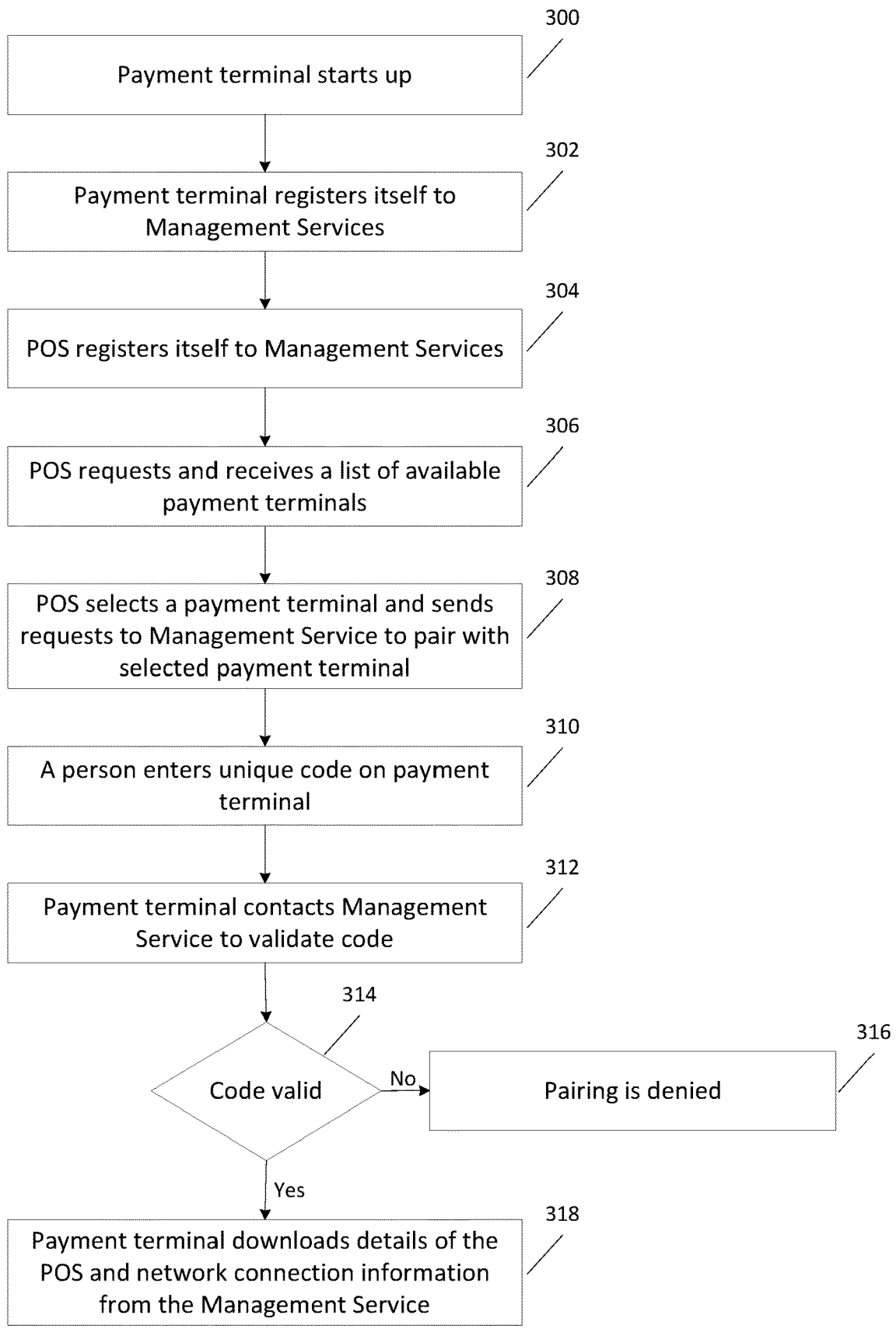
FIG. 10 shows a flow diagram of a registration and pairing process between a POS system, a payment terminal and a management services module.

FIG. 10 shows an embodiment of a process flow for a payment terminal and POS system to register with a management service system, and to connect with each other. In one embodiment the payment terminal, POS system and management service system are as described with reference to FIG. 4 and the process flow substantially implements a pairing process as described herein with reference to FIG. 5.

Following a payment terminal starting up (step 300), it identifies the contact address for the management services module (e.g. a web domain, the identifier of which is included in the WebSocket application on the payment terminal) and registers itself to the management services module, for example using built in 3G communications. The payment terminal registers itself to the Management Service (step 302) and similarly the POS system registers itself to the Management Service (step 304). Registration includes, for example, providing a merchant ID and a device ID. If there are more than one POS system and/or more than one payment terminal, steps 304 and 302 are repeated.

The POS system requests a list of payment terminals available for it to pair with based on parameters (location, floor, capabilities etc.) (step 306). The list may be prepared by the management services module, at least in part based on the metadata it has received from payment terminals.

The POS system presents the available terminals and receives via a user interface a selection of at least one payment terminal to pair and connect with. The POS system sends request(s) to the management service to pair and connect with the selected payment terminal(s), the requests including an associated authentication token generated by the management services module (step 308). The authentication token is provided to a person together with an identifier for the terminal, for example by being displayed on a display of or in communication with the management services module. A person enters the authentication token generated by the POS at step 308 on the payment terminal (step 310). If the token entered by the person on the payment terminal at step 310; i.e. the token generated by the POS at step 308, does not match the token generated by the payment terminal at step 308, the code will not be valid and the pairing will be unsuccessful. If the token entered by the person on the payment terminal at step 310, i.e. the token generated by the POS at step 308, matches the token generated by the payment terminal at step 308, the payment terminal downloads details of the POS system and network connection information from the Management Service, configures itself based on the connection information and sends a notification to the management service module. The management services module sends a notification to the POS system that the process is complete.

In one embodiment the API(s) described herein return, responsive to a call, a list of functions supported by the APIs. The supported functions include, for example a purchase, a refund or other transaction or control related functions. In one embodiment, another call to one or more the described API(s), for example a call specifying a function name, returns the input and output parameters for the function. As more APIs are added, the list of functions expands.

In one embodiment, the API provides a function to expose, by the payment terminal, features which at least in part are not processed on the terminal. Examples of functions that may be exposed by the payment terminal through the API include one or more of:

- Using a screen on the payment terminal to display barcodes, for example barcodes that facilitate eWallet transactions. One example is that a merchant or user identifies through a user interface the payment to be made by an eWallet. The POS asks the terminal to pay via this wallet. The terminal communicates with another backend service that starts the eWallet transaction. To complete the transaction the user opens up an app on their phone written by the eWallet provider. They scan a barcode that is displayed on the payment terminal screen (this was returned by the backend service). The app on the phone completes the eWallet transaction. The eWallet provider calls the backend service. It tells the payment terminal that it was a success, the barcode is removed and it displays a successful message. The terminal then informs the POS.
- Using the screen to capture customer feedback postpurchase. For example, a question is displayed on the screen of the payment terminal "How was the service. Good=green button, bad=red button". To achieve this the POS sends extra data in a purchase request to the terminal that indicates after a transaction the question is to be displayed. The payment terminal receives the input and communicates the response to the POS system.
- Using the screen to display or capture information prepurchase. For example a question is displayed on the screen of the payment terminal "Did you order a coffee and raisin toast? green=yes, red=no". As with the preceding example, the POS sends extra data in the purchase request to the terminal to facilitate this function.
- Using the API to capture and report on data sent from the POS e.g. SKU data. The POS sends the data for a request, via the API with the payment terminal. The returned data is then sent by the payment terminal to a backend system for storage and use.
- Provide unsolicited messages back to the POS, for example notifications regarding terminal health, or network issues e.g. "VISA cards issued by XYZ are having issues today" or "We are experiencing transaction processing delays today". The terminal connects to a notification system so it can receive unsolicited requests. On receiving the notifications, it sends them on to any POS systems connected via the WebSockets API. The detail and format of these message is detailed in the WebSockets API.
- Real-time terminal diagnostics reported from the terminal e.g. for detection of patterns in purchase behaviour, patterns in payment failures, detection that a payment terminal is about to cease working, detection of a requirement to retrieve a payment terminal because the battery is about to fail. The terminal logs the pertinent information with the real-time monitoring system, which identifies the patterns and performs actions or raises alarms based on the log and various rules applied to the log.
- Integration into other banks back-end systems, not normally accessible to a POS. The detail and format of these message is detailed in the WebSockets API.
- The ability for the terminal to run in standalone mode if connectivity to the POS is lost. At the time which the connection is re-established the terminal is configured to replay back any of the financial transactions that happened whilst the two systems were disconnected.

The payment terminal is configured so that the server of the payment terminal 2 has no access to any secure element, secure data, PIN data, or banks host communications. Neither is any secure data communicated by the payment terminal to the server. In one embodiment the payment application 6 is configured to mask all secure data elements in data communications with the WebSocket application 5.

Figure 11:
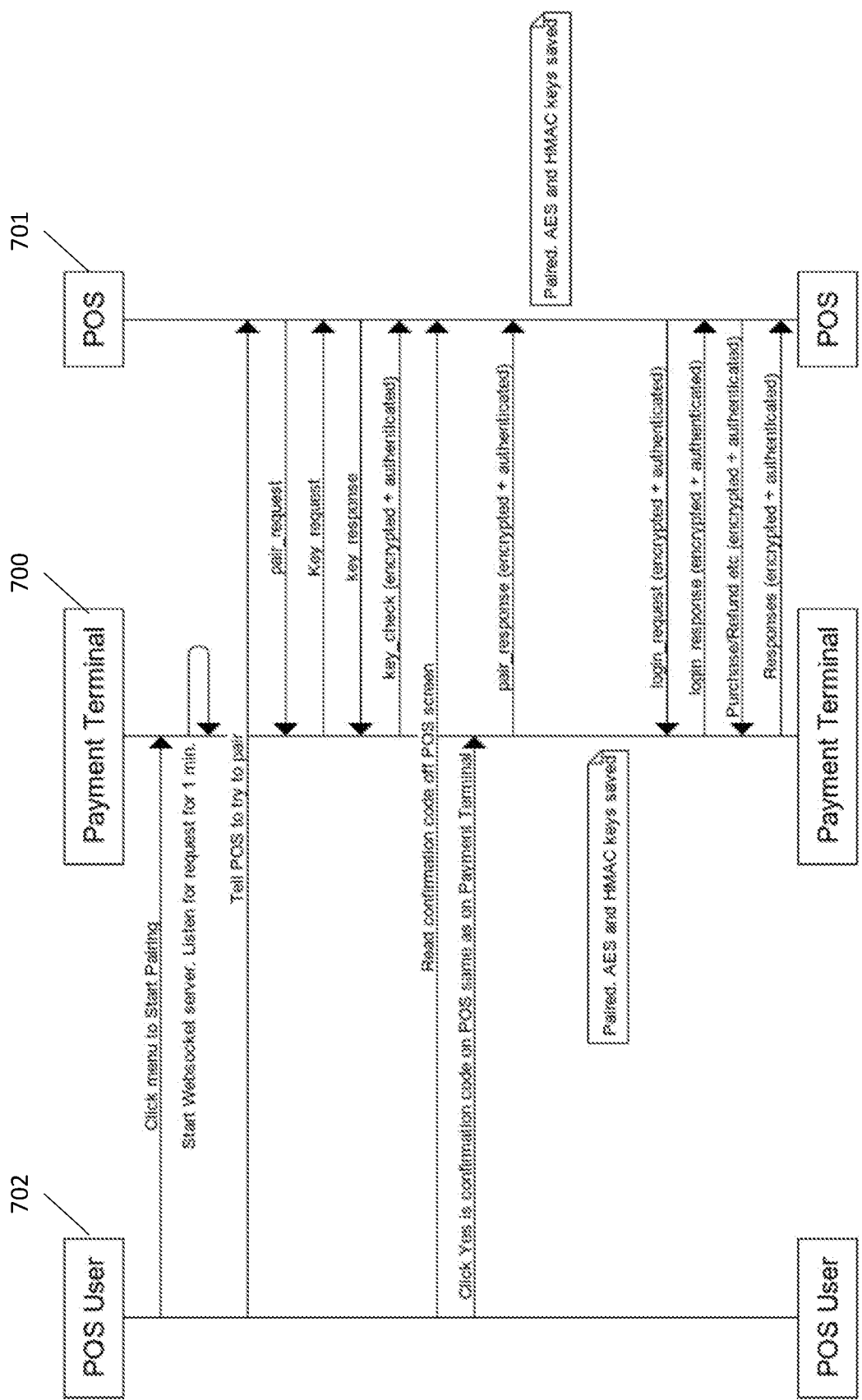
FIG. 11 shows communications between a payment terminal, a POS device and a POS user for establishing a trusted relationship for communication of transaction requests.

FIG. 11 shows a sequence diagram of a method of pairing a payment terminal 700 with a POS device 701. The pairing process establishes a trusted relationship between the payment terminal 700 and the POS device 701, by virtue of exchanging keys for encryption of communications. The pairing can be performed directly between the payment terminal 700 and POS device 701 over a network without the need for communication with another system, for example the system of a bank.

In one embodiment, the payment terminal 700 and POS device 701 are part of a payment system as described herein with reference to FIG. 1, FIG. 2 and FIG. 3 and are implemented according to any one of the implementations of payment terminal and POS described with reference to those figures. In one embodiment a payment system including the payment terminal 700 and the POS device 701 takes the form described herein with reference to any one of FIGS. 4 to 6.

Instructions for causing the payment terminal 700 to implement the processes described with reference to FIG. 11 may part of the payment application 6 described above and the API 7 and plugin 5 configured to facilitate the processes. Similarly, instructions for causing the POS device 701 to implement the processes described herein with reference to FIG. 11 may form part of the POS application 12.

Consistent with the embodiments described with reference to FIGS. 4 to 5, the payment terminal 700 may include a websocket server and POS device 701 communicates with the WebSocket server using a WebSocket protocol. In other embodiments, the payment terminal 700 and POS device 701 are implemented using a different connection type, including a different protocol from WebSocket protocol. For example network sockets, Bluetooth or USB protocols may be used, or HTTP with http polling or long polling.

FIG. 11 also depicts a POS User 702. The POS User 702 is a person operating the payment terminal 700 and POS device 701, for example an employee or owner of a merchant.

The payment terminal 700 is initialised and configured to connect to a network, for example a WiFi and/or Ethernet network. In one embodiment, if the payment terminal 700 does not have a current pairing with a POS device, it displays, for example on its display screen, a message requesting that the user pair the payment terminal with a POS device. In one embodiment the payment terminal 700 displays the identifier of the network (e.g. SSID) it is connected to. In one embodiment the payment terminal 700 displays the address of the payment terminal, for example the IP address. In one embodiment the payment terminal displays an icon, for example a button "Pair with POS", the selection of which indicates input to start pairing. In one embodiment two or more of the network identifier, payment terminal address and icon are displayed on the same screen display.

The payment terminal 700 receives an input to start pairing. In the embodiment depicted in FIG. 11, the start pairing input is provided by the POS User 702 selecting or entering a start pairing input. In other embodiments, the payment terminal 700 receives the input from another device, for example from a remote terminal operated by the POS User 702. In either case, in some embodiments the payment terminal may require entry of a password by the POS User 702 before allowing pairing to proceed. For example, after receiving the input to start pairing the payment terminal may display a message "MERCHANT Enter Password" or similar and provide a field in which the password may be entered by the POS User 702.

In some embodiments the payment terminal 700 provides its address to the POS user 702, for example by displaying it on a display screen of the payment terminal 700. In some embodiments the display screen is a touch screen display. The payment terminal 700 may display its address, for example its internet protocol (IP) address. In one embodiment display of the address is accompanied by instructions to enter the address at a POS device. The instructions may further include on which network(s) the POS device should be connected, being the network(s) to which the payment terminal 700 is connected, for example the network(s) that the websocket server is listening on for a pair request message. If the input to start pairing was received from a remote terminal operated by the POS User 702, in one embodiment the payment terminal 700 provides its address information to the remote terminal. In other embodiments the address information is only displayed locally at the payment terminal 700.

The payment terminal 700 then listens for a pair request from a POS device. The listening may be responsive to and/or dependent on one or both of receipt of the start pairing input and a correct password. In the embodiment depicted, the payment terminal 700 includes a WebSocket server for the relevant communications and it is this server that is initiated and listens for a pair request. In one embodiment the payment terminal 700 listens for a pair request for a certain duration of time, for example one minute, which may be a predetermined time interval configured within the payment terminal 700. The time interval may be reconfigurable. In implementations in which the payment terminal 700 listens for a pair request for a certain duration of time, a timer may commence at the same time, or at about the same time as the address is displayed. In an example implementation the payment terminal may show progression of the timer, for example showing a counter that counts down and/or using a graphical representation of a timer. In other embodiments the time interval, or another time interval, is provided for completion of pairing. Progression of this timer may also be displayed by the payment terminal 700, for example on its display screen, at various points through the pairing process.

In embodiments in which the payment terminal 700 listens for a pair request for a certain duration of time, action may be taken responsive to expiry of the allocated time without receipt of a pair request. For example, if a pair request is not received within the allocated time, the payment terminal 700 closes the connection on which it was listening for the pair request and terminates the pairing process. The payment terminal 700 may then return to a state of displaying a prompt to pair the payment terminal with a POS device.

The POS terminal 701 receives an input to request pairing. In the embodiment depicted in FIG. 11, the request pairing input is provided by the POS User 702 navigating a menu structure of the POS terminal 701 and selecting or entering a request pairing input. In other embodiments, the POS terminal 701 receives the input from another device, for example from a remote terminal operated by the POS User 702. In either case, in some embodiments the POS terminal may require entry of a password by the POS User 702 before allowing pairing to proceed. In some embodiments the POS terminal 701 receives an address of a payment terminal, for example the IP address of the payment terminal 700 described above. The address may be provided by the POS User 702 entering or selecting the address. The POS terminal 701 then addresses a pair request message to the payment terminal 700.

The POS terminal 701 transmits a pair request message, for example an IP addressed pair request message, generated based on the input to request pairing described above. The transmission may be responsive to receipt of the pair request input. The pair request message is in a form compatible with the payment terminal 700, for example, using the WebSocket protocol if the payment terminal 700 implements a WebSocket server as described above. The pair request message is sent in cleartext, that is the pair request message is sent unencrypted. The pair request message may include an identifier of the POS device. The pair request message may include an identifier of the message, which is generated by the POS device. An example pair request message, in accordance with an API, for example the API 7 described herein, is:

```
{
    "message": {
        "event": "pair_request",
        "pos_id": "POS3",
        "id" : "message id (POS generated)"
    }
}
```

The payment terminal 700 receives the pair request message. In one embodiment the payment terminal 700 provides feedback to the POS User 702 that it has received a pair request message. For example, the payment terminal 700 may display, on its display screen, a screen display including a message indicating that a pairing process has commenced, for instance a message "Pairing POS . . . " or similar. In embodiments with a timer for completion of pairing, a representation of the timer may also be included in the screen display.

The payment terminal 700 and POS terminal 701 establish a connection for encrypted communication. Known cryptographic techniques may be utilised, for example HMAC, AES and Diffe-Hellman.

The payment terminal 700 transmits, to the POS terminal 701, a key request message. The key request message is also sent in cleartext. Transmission of the key request message may be responsive to and/or dependent on receipt of a pair request message addressed to the payment terminal 700. The payment terminal 700 may pick a secret, for example secret number, and performs a computation on that secret in accordance with the encryption protocol used, with the result sent within the key request message. The key request message may also include a message identifier, generated by the terminal.

With reference to an example utilising Diffie-Hellman key exchange, the modulus p and base g are known to the payment terminals and the POS devices. The payment terminal secret is designated a. The payment terminal computes A=g^a mod p, with the result A being returned in cleartext. An example key request message, in accordance with an API, for example the API 7 described herein, is:

```
{
    "message": {
        "event": "key_request",
        "id" : "message id (terminal generated)",
        "data": {
            "hmac" : {
                "A": "g^a mod p",
            },
            "enc" : {
                "A": "g^a mod p"
            }
        }
    }
}
```

The POS device 701 transmits, to the payment terminal 700, a key response message. Transmission of the key response message may be responsive to receipt of the key request message. The POS device 701 may pick a secret, for example a secret number, and performs a computation on that secret in accordance with the encryption protocol used, with the result sent within the key response message. The message identifier from the key request message may be included as an identifier in the key response message. The key response message may include the identifier of the POS device.

Continuing with the example utilising Diffie-Hellman key exchange, the POS device secret is designated b and the resulting computation designated B. A different secret b is selected for "hmac" and "enc". An example key response message, in accordance with an API, for example the API 7 described herein, is then:

```
{
    "message": {
        "event": "key_response",
        "id" : "message id (return terminal-generated id from key_request)",
        "pos_id" : "POS3"
        "data": {
            "hmac" : {
                "B": "g^b mod p"
            },
            "enc" : {
                "B": "g^b mod p"
            }
        }
    }
}
```

The payment terminal 700 transmits, to the POS device 701, a key check message. Transmission of the key check message may be responsive to receipt of the key response message. The key check message includes an encrypted body. In some embodiments the encrypted body includes one or both a field indicating the message as a key check message and a message ID generated by the payment terminal 700, different from the message ID included in the key request.

Continuing with the example utilising Diffie-Hellman key exchange, an example key check message, in accordance with an API, for example the API 7 described herein, is then:

```
{
    "hmac" : "HMAC-SHA256 of 'enc' using the HMAC Secret" ,
    "enc" : "AES (mode CBC) encrypted body using the AES Secret "
}
```

Where the body that was the subject of the encrypted body is:

```
    "message" : {
        "event": "key_check",
        "id" : "message id (terminal generated)"
    }
```

The payment terminal displays a code, related to the key exchange, for example on a display screen of the payment terminal. The code is one that is generated using the encryption protocol between the POS device and payment terminal, which is usable to validate the pairing between the two devices. The payment terminal may be configured to receive input validating the pair request locally only. In other words and with reference to the example entities referred to herein with reference to FIGS. 11 and 13, irrespective of whether or not preceding steps have been performed by the POS user 702 using a remote terminal, the payment terminal 700 only accepts input from its display 45 (which as described below may be a touch screen display) and/or from its keypad 46. The validation may assist to ensure an intermediary device has not been added between the POS device and the payment terminal, for example as part of a "man-in-the-middle" attack. The code may, for example, be the first six characters of the HMAC. The payment terminal also displays a prompt for the user to indicate whether or not the code displayed on its screen matches a code displayed by the POS device 701 (see below). In some embodiments the payment terminal also displays instructions to the POS User 702. For example the instructions may include a request to confirm the pairing code. A request may be in the form of a question, such as "Is the POS displaying this identical pairing code?" displayed next to the displayed code.

The POS device 701 receives the key check message and generates its own HMAC of the ENC attribute. If it matches the one in the message received, the encrypted body is decrypted. If the decrypted body is a key check message, the POS device displays the code related to the key exchange (e.g. the first six characters of the HMAC), for example on a display screen of the POS device.

The payment terminal 700 receives an input that the code displayed on its screen matches a code displayed by the POS device 701. In one embodiment the payment terminal 700 provides feedback to the POS User 702 that the payment terminal 700 has received the input and pairing is continuing. For example a screen display displaying the code may be replaced with another screen display. The other screen display may include a message such as "Finalising pairing . . . " or similar. Responsive to receipt of an input confirming matching codes, the payment terminal continues pairing by the sending of a pair response message. The payment terminal also saves the keys for future use.

An example pair response message, sent following receipt of input that the codes match, in accordance with an API, for example the API 7 described herein, is:

```
"message" : {
    "event": "pair_response",
    "id" : "message id (copied from pair_request from POS)",
    "data" : {
        "ok" : "true"
    }
}
```

If the POS User 702 indicates that the codes do not match, then the pair response message indicates this. Responsive to this message the payment terminal drops the connection and does not save the keys. The payment terminal may display on its display a pairing failure message, for example "Pairing Failed".

Following input that the codes match, pairing is completed and the POS device 701 may then login to the payment terminal 700, for example by sending a login request. The login request is sent encrypted, using the exchanged keys. The payment terminal 700 receives the encrypted login request, decrypts it and in response sends a login response message, which is also encrypted. In one embodiment the payment terminal 700 is configured to accept a login request from the POS device 701 only within a predetermined time period following sending of the pair response message, for example within 1 minute.

If the pairing is successful, the payment terminal 700 may display, for example on its display screen, a message indicating successful pairing. The message may include the identifier of the POS device 701 communicated to it by the POS device 701 during the pairing process described above. The message may be on a screen display, which also displays an icon to exit the pairing process, for example to continue setup of the payment terminal 700.

If the pairing is unsuccessful, the payment terminal 700 may display instead a pairing unsuccessful message. The message may be on a screen display, which also displays an icon to try the pairing process again.

Following successful login to the payment terminal 700 by the POS device 701, the payment terminal may display, for example on its display screen, a message indicating the login. In the instance that the pairing was with a POS device 701 that sent an identifier of POSID_001, the message may, for example, be "Connected to "POSID_001". The payment terminal 700 also provides, through its user interface, an option to unpair the payment terminal with a POS device and may display the ID of the POS device(s) that are currently paired with the payment terminal.

After login to the payment terminal 700 by the POS device 701 the POS device may send to the payment terminal 700 transaction requests, for example for a purchase or refund. The payment terminal 700 sends responses to the transaction requests. The transaction requests and responses are encrypted. Once paired the payment terminal 700 and POS device 701 use the HMAC key to generate a one-way HMAC key of the encrypted data, to provide authentication between the POS device 701 and the payment terminal 700. If this doesn't match a message can be treated as "tampered" with and action taken by one or both of the payment terminal 700 and the POS device 701. The action may include one or more of providing a user notification, dropping a connection and unpairing. The action may be dependent on occurrence of a predetermined number of authentication failures.

In some embodiments the payment terminal 700 includes a function to request the POS device 701 to generate new keys. This function may be invoked periodically, for example once every 7 days. The payment terminal 700 may request new keys following the expiry of the predetermined time period at a time when the payment application in the payment terminal 700 is idle. If the POS device 701 does not respond with a key response message, the payment terminal may periodically resend the new key request, for example when next idle after 30 minutes has elapsed from the previous attempt. The payment terminal may count the number of requests, for example by incrementing or decrementing a counter. When the count reaches a pre-set number, for example three, the payment terminal may terminate the request new keys process, drop the current encryption keys and drop the connection with the POS device 701, for example by terminating any open connection and not accepting further communications from the POS device 701 unless it is again paired with the payment terminal.

In one embodiment, after first keys are exchanged by a process that includes a confirmation step of a POS User 702 confirming that the same codes are displayed on both the payment terminal 700 and the POS device 701 (e.g. as described above with reference to FIG. 11), then new keys are exchanged between the paired payment terminal 700 and POS device 701 without this confirmation step.

In one embodiment the payment terminal 700 requests the POS device 701 to generate new keys by sending a request new keys message. The request new keys message is encrypted using the current keys. The POS device 701 receives the request new keys message and responds with a use next keys message. The payment terminal 700 and POS device 701 then use new keys for subsequent communications. The new keys are generated by:

HMAC secret key=SHA256(CURRENT_HMAC_SECRET);

AES Secret Key=SHA256(CURRENT_AES_SECRET).

In one embodiment, the payment terminal retains the current keys when new keys are generated. If the payment terminal cannot match the HMAC, it automatically attempts to use the earlier keys.

In one embodiment the payment terminal 700 implements processes for alerting to communication failures between it and the POS device 701. In one implementation, the following process is completed:

1. After a predetermined number (e.g. five) of consecutive HMAC failures on the payment terminal:
   a. Drop the connection;
   b. Provide feedback, for example using a speaker to generate a beep sound and/or display a message on the terminal "HMAC Messaging Error";
   c. Require the user to acknowledge the error, for example by selecting an icon "OK" on the payment terminal; and
   d. On acknowledgement by the user, start accepting incoming connections again.
2. Continue counting consecutive HMAC failures and after a second predetermined number of failures, greater than the first predetermined number of failures (e.g. 15 including the first five where the first predetermined number is five):
   a. Drop the connection;
   b. Provide feedback to the user, for example a persistent or repeating beeping sound and/or display a message on the terminal such as "Terminal unpaired due to HMAC Messaging failure. Repairing required. Report to bank";
   c. Require the user to acknowledge the error, for example by selecting "OK".

e. Drop the pairing keys for the given POS ID. Go back to unpaired state

If at any stage during completion of the process including steps 1 and 2 above a HMAC is successfully received/validated/parsed, then the counter is reset.

It will be appreciated that the pairing process described above facilitates a many-to-one relationship, i.e. where many POS systems can pair with the payment terminal 700. It also supports a one-to-many relationship where the POS device 701 can pair with many payment terminals. It also supports a many-to-many relationship.

Figure 12:
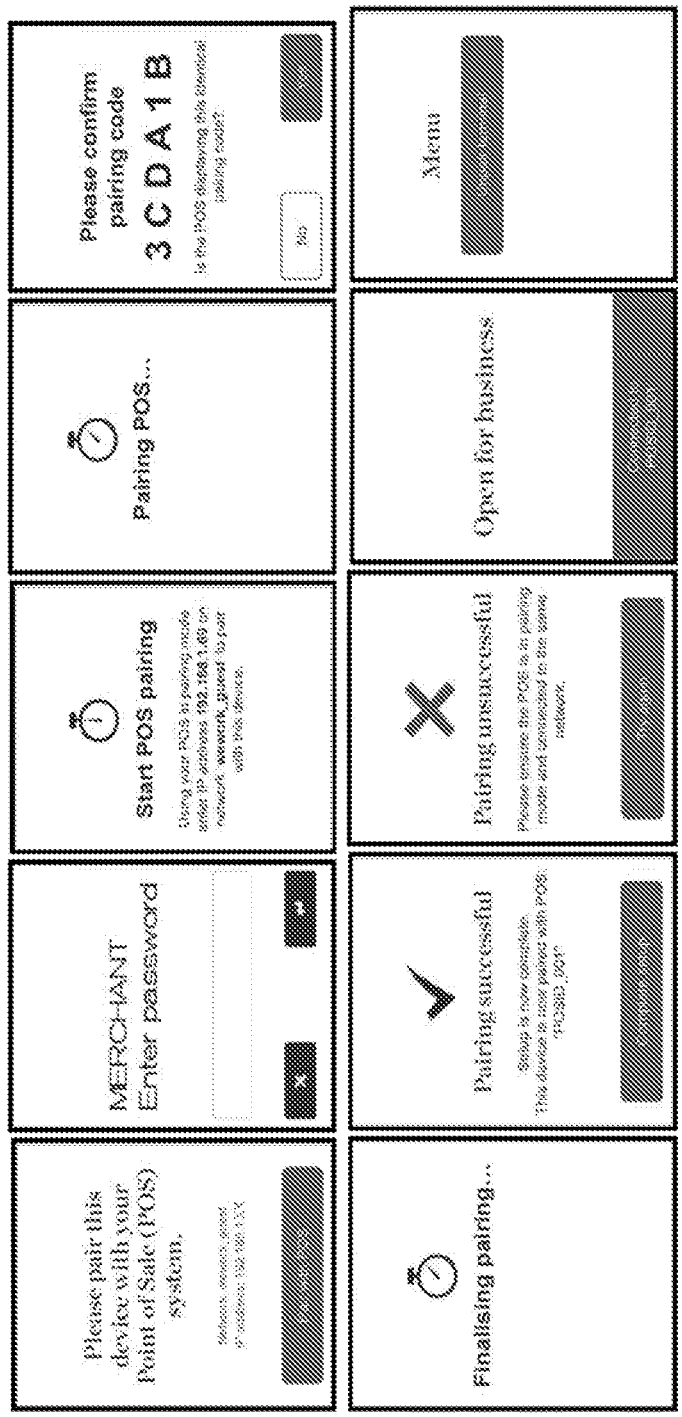
FIG. 12 shows screen displays for display on a display screen of a payment terminal, for example a payment terminal of FIG. 11.

FIG. 12 shows an example of screen displays of the payment terminal 700 that may be displayed for example, on the display screen of the payment terminal 700 during the pairing process described above. In general, the screen displays are shown in sequence, starting in the top left corner and moving across the row, then from left to right across the bottom row. The screen displays with messages "Pairing successful" and "Pairing unsuccessful" are alternatives.

Figure 13:
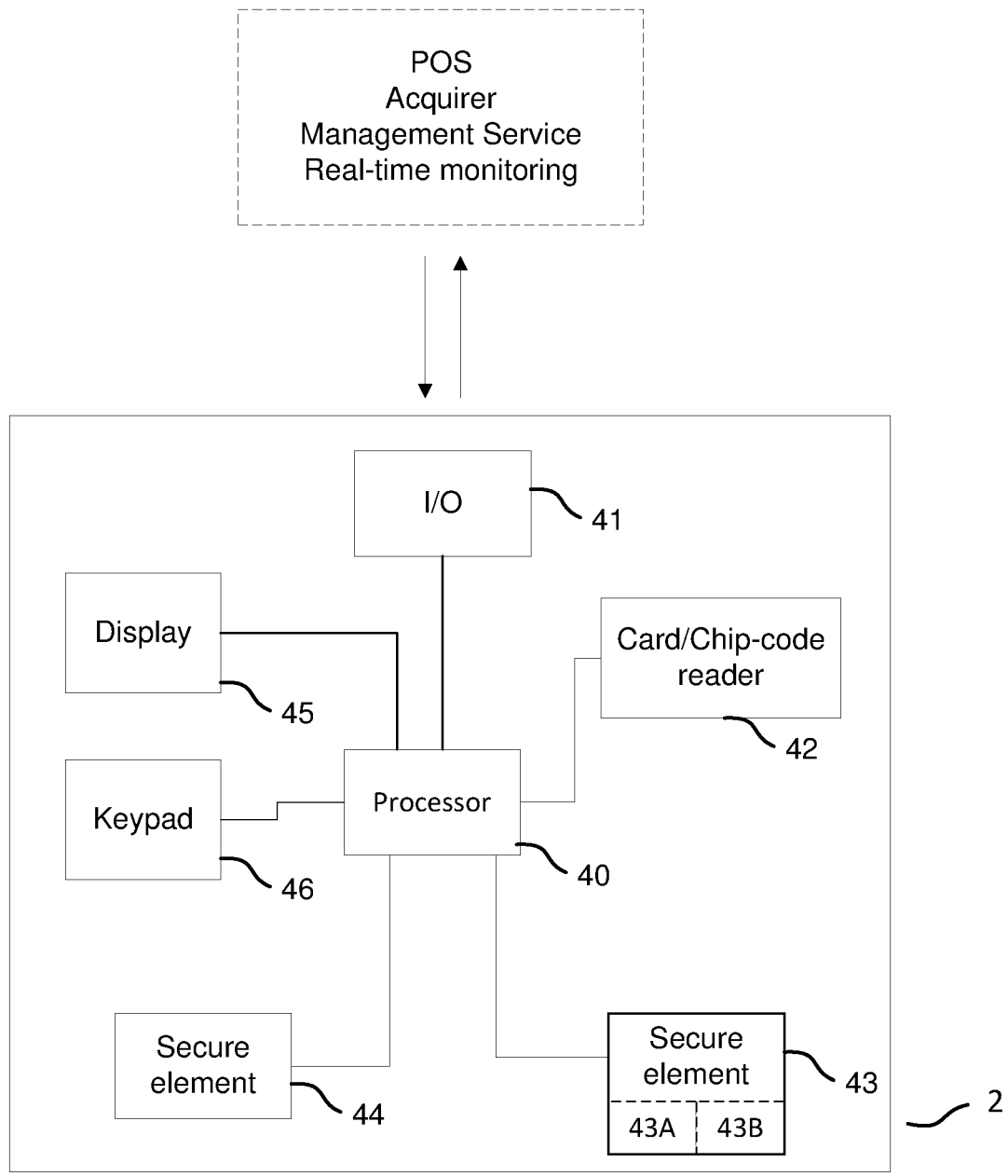
FIG. 13 shows a block diagram of a payment terminal.

FIG. 13 shows a diagram of an embodiment of a payment terminal, which for example may be an embodiment of the payment terminal 2 and therefore like reference numerals are adopted. The payment terminal depicted in FIG. 13 may also be an embodiment of the payment terminal 700. Components not directly involved with the processes described herein, for example a power supply, are not shown.

The payment terminal 2 includes a processor 40, for example a microprocessor. The processor 40 controls the communications and data processing functions of the payment terminal 1, including the communications and data processing functions described herein. The processor 40 may, for example be a 32-bit RISC processor and have associated memory 50, which may store the payment application described herein.

A input/output (I/O) interface 41 is provided, suitable for network communication such as by Ethernet, Wi-Fi and/or cellular communication. Communications with a POS system, for example the POS system 2, a management services, for example managements services module 20 and/or real time monitoring, for example real time monitoring module 30 are through the I/O interface 41. In addition, I/O interface 41 is used for communication with a transaction acquirer associated with the payment terminal 2.

A reader 42 provides functionality to identify transaction particulars. The reader 42 may include one or more of a magnetic swipe card reader, a chip reader, a NFC interface and a barcode reader.

Secure element 43 includes one or more memory elements that include the program and data for receiving card payment data, PIN data and related information for a transaction. It also includes the program and data for communicating transaction details to a transaction acquirer. The program acts as a client. For example, secure element 43 stores the payments application 6 and also stores the API 7.

A second secure element 44 includes one or more memory elements that include the program and data for communications via a server to another entity. The secure element 43 is physically and/or logically isolated from the memory element 44, for example so that a process from secure element 44 cannot access data or code in secure element 43.

While one processor 40 is shown, in some embodiments there is more than one processor. For example, a first processor 40 may communicate with secure element 43 and the second processor 44 communicate with secure element 44.

The payment terminal 2 includes a display 45 for presenting information to a user. The display 45 may, for example, display the screen displays shown in FIG. 12. The display 45 may be a touch screen display. The payment terminal 2 may also include a keypad 46 for receiving input from a user of the payment terminal 2.

In one embodiment the secure element 43 includes a first memory space 43A and a second memory space 43B, distinct from the first memory space 43A. The first memory space 43A includes instructions to implement a user-interface for the payment terminal, including for example instructions to cause the payment terminal to display information on its display screen 45. The second memory space 43B includes instructions to implement the web-socket server described herein. The instructions to implement a user-interface for the payment terminal may be in one binary and the instructions to implement the web-socket server may be in another binary. The web-socket server is configured to use an API to call the functions for implementing the user-interface.

It will be understood that certain steps in process flows described herein may be completed in a different order from that described without in substance varying the overall functionality provided by the process flow. Such variations in order are intended to be within the disclosure of this specification, as if individually set forth.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A transaction system comprising:
a payment terminal, the payment terminal comprising:
  a payment application for processing transaction requests; and
  a web server application implementing a websocket protocol for client-server communication over a communication channel with a plurality of further transaction system devices, wherein the payment terminal is configured to additionally communicate as a client with an acquirer server; and
a plurality of point-of-sale (POS) systems, wherein each point of sale (POS) system:
  is one of the said plurality of further transaction system devices;
  is configured to make a connection request to the webserver application implementing a websocket protocol, to establish a web services bidirectional communication link between the payment terminal and the POS system over the web services bidirectional communication link; and
  is configured to send, over the web services bidirectional communication link, transaction requests to the payment terminal, and
wherein the payment terminal is configured to, in response to the connection request:
  implement a pairing process with the POS system over a network, the pairing process establishing a trusted relationship between the payment terminal and the POS system whereby the transaction requests are encrypted in accordance with an encryption protocol between the payment terminal and the POS system, wherein the pairing process includes the payment terminal receiving, at the webserver application implementing a websocket protocol over the web services bidirectional communication link, a pair request message from the POS system and communicating, by the web server application implementing a websocket protocol, the pair request message to the payment application via one or more APIs for processing by the payment terminal;

generate a first code from an element of the encryption protocol, the first code generated in response to the pair request message received from the POS system, wherein the element of the encryption protocol is known by the POS system;

display during the pairing process, on a display of the payment terminal, the first code that is generated using the element of the encryption protocol so that the first code is able to be independently generated as a second code by the POS system with which the payment terminal is pairing, but not able to be independently generated by other devices;

cause the display of the second code on a display of the POS system of the plurality of POS systems; and receive user input, via a physical user interface of the payment terminal, the user input indicating the first code displayed by the payment terminal and the second code displayed by the POS system match, wherein completion of the pairing process to establish the trusted relationship is responsive to and dependent on receiving the user input indicating the first code and the second code match.

2. The transaction system of claim 1, further comprising a management services module, wherein the management services module:

is a said further transaction system device; and is configured to provide the payment terminal with connection information for the POS system.

3. The transaction system of claim 2, comprising a plurality of payment terminals, wherein the management services module is configured to:

provide, to the POS system, terminal identifiers of the plurality of payment terminals;

receive, from the POS system, information indicating a selection of a terminal identifier; and provide the payment terminal associated with the terminal identifier with the connection information.

4. The transaction system of claim 3, wherein the management services module:

in response to receipt of the terminal identifier generates and causes display of a code on a display associated with the management services module; and provides the payment terminal associated with the terminal identifier with the connection information only after receipt from the payment terminal of data identifying the code.

5. The transaction system of claim 1 further comprising a monitoring module, wherein the monitoring module is a said further transaction system device and wherein the payment terminal is configured to report status information to the monitoring module.

6. The transaction system of claim 1 wherein the web server utilises a WebSockets protocol for the client-server communication.

7. A payment terminal comprising:

a payment application for processing transaction requests; and a webserver application implementing a websocket protocol for client-server communication over a communication channel with a plurality of transaction processing-devices, each of the transaction processing devices comprising a point of sale (POS) device, wherein the webserver application implementing a websocket protocol is configured to implement the client-server communication with the POS device as a web services bidirectional communication link; wherein:

the webserver application implementing a websocket protocol and payment application communicate via one or more application programming interfaces (APIs);

the payment terminal is configured to implement a pairing process with each of the point-of-sale (POS) devices over the web services bidirectional communication link, the pairing process comprising:

receiving, at webserver application implementing a websocket protocol over the web services bidirectional communication link a pair request message from each of the POS devices, wherein the pair request message is unencrypted;

generate a first code from an element of an encryption protocol, the first code generated in response to the pair request message received from each of the POS devices, wherein the element of the encryption protocol is known by each of the POS devices;

displaying during the pairing process for each of the POS devices, on a display of the payment terminal, the first code that is generated using the element of the encryption protocol so that the first code is able to be independently generated as a second code by each of the POS devices with which the payment terminal is pairing, but not able to be independently generated by other devices;

cause the display of the second code on a display of each of the POS devices; and receiving user input, via a physical user interface of the payment terminal, the user input indicating the first code and the second code displayed by each of the POS devices match;

responsive to the received user input, completing the pairing process whereby requests from each of the POS devices are encrypted according to the encryption protocol and are received by the webserver application implementing a websocket protocol and communicated to the payment application via the one or more APIs for processing by the payment terminal; and the payment application is configured to additionally communicate as a client with a transaction acquirer server.

8. The payment terminal of claim 7, wherein the payment terminal returns via the web server application implementing a websocket protocol, in response to a call, a list of functions supported by the one or more APIs.

9. The payment terminal of claim 8, wherein the payment terminal is configured to receive, via the web server application implementing a websocket protocol, an update to the one or more APIs.

10. The payment terminal of claim 9, wherein the update comprises adding a new API.

11. The payment terminal of claim 7 wherein the payment application is on a secure element of the payment terminal, whereby a process on the webserver application implementing a websocket protocol cannot access data of the payment application except for through the one or more APIs.

12. The payment terminal of claim 11, wherein the web server application implementing a websocket protocol runs on another secure element of the payment terminal, different from the secure element for the payment application.

13. A method of establishing a transaction system, comprising:
   providing one or more merchant terminals, each merchant terminal comprising:
      a payment application configured to communicate as a client with a transaction acquirer server and
      a web server application implementing a websocket protocol for client-server communications over a communication channel with a plurality of POS systems, wherein the webserver application implementing a websocket protocol is configured to implement the client-server communication with the POS systems as a web services bidirectional link, with one or more APIs for communications therebetween;
   providing the plurality of POS systems for the one or more merchant terminals, each of the POS systems communicating via the webserver application implementing a websocket protocol;
   providing a management services module, the management services module communicating with the merchant terminal, through the webserver application implementing a websocket protocol, and with each of the POS systems, the management services module managing connections between the one or more merchant terminals and each of the POS systems;
   the method further comprising, at the merchant terminal:
      displaying, on a display screen, a network address of the merchant terminal;
      receiving, at said network address, a pairing request from each of the POS systems, wherein the pairing requests are received by the webserver application implementing a websocket protocol and communicated to the payment application via one or more APIs for processing by the merchant terminal;
      exchanging encryption keys, via the management services module, with each of the POS systems;
      generating a first code from an element of an encryption protocol, the first code generated by the merchant services module in response to the pair request received from each of the POS systems, wherein the element of the encryption protocol is known by each of the POS systems;
      displaying, on the display screen of the merchant terminal, the first code generated by the management services module so that the first code is able to be independently generated as a second code by each of the POS systems with which the payment terminal is pairing, but not able to be independently generated by other devices;
      receiving, via a physical user interface of the merchant terminal, user input responsive to the displayed first code; and
      selectively pairing or not pairing with each of the POS systems, via the management services module, dependent on said user input.

14. The method of claim 13, wherein the management services module is remote from the plurality of POS systems and the one or more merchant terminals.

15. The method of claim 13, wherein the plurality of POS systems and the one or more merchant terminals are local with respect to each other.

16. The payment terminal of claim 7, wherein:
   the web services bidirectional link is configured for receiving transaction requests from each of the POS devices over the communication channel; and
   the pairing process establishes a trusted relationship between the payment terminal and each of the POS devices whereby the received transaction requests are encrypted in accordance with the encryption protocol.

* * * * *